(12) United States Patent
Proejts et al.

(10) Patent No.: US 12,057,897 B2
(45) Date of Patent: *Aug. 6, 2024

(54) METHOD AND APPARATUS FOR WI-FI CONCURRENT DUAL HIGH BAND WITH ANTENNA SHARING

(71) Applicant: Dell Products, LP, Round Rock, TX (US)

(72) Inventors: Lars Fredrik Proejts, Zhongshan District (TW); Suresh K. Ramasamy, Cedar Park, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/388,849

(22) Filed: Jul. 29, 2021

(65) Prior Publication Data

US 2023/0032544 A1  Feb. 2, 2023

(51) Int. Cl.
*H04L 5/00* (2006.01)
*H04B 7/0413* (2017.01)
(Continued)

(52) U.S. Cl.
CPC .......... *H04B 7/0413* (2013.01); *H04W 84/12* (2013.01); *H04W 88/06* (2013.01)

(58) Field of Classification Search
CPC .. H04B 7/0413; H04B 7/0608; H04B 7/0817; H04W 84/12; H04W 88/06; H04L 43/50;
(Continued)

(56) References Cited

U.S. PATENT DOCUMENTS 7,421,004 B2  9/2008  Feher
8,824,966 B2  9/2014  Boes
(Continued)

FOREIGN PATENT DOCUMENTS

EP  1681772 A1  7/2006
EP  1681772 B1  8/2008
(Continued)

*Primary Examiner* — Phuongchau Ba Nguyen
(74) *Attorney, Agent, or Firm* — Prol Intellectual Property Law, PLLC; H. Kenneth Prol

(57) ABSTRACT

An information handling system may include a processor; a memory; a power management unit (PMU); a wireless interface adapter to communicate, via a plurality of transceiving antennas operated by one or more radios, a plurality of operating wireless links, wherein the plurality of transceiving antennas operate in a multiple-in-multiple-out (MIMO) array configuration; an antenna controller to receive data descriptive of network data traffic information, wireless connection states, and signal telemetry data via a sideband wireless communication link from a wireless front end and initiate a dual high band wireless local-area network (WLAN) communication by switching a first transceiving antenna of the plurality of transceiving antennas associated with the cellular front end to be operatively coupled to one or more high band ports at the WLAN front end; and the antenna controller to issue instructions to the cellular front end to adjust a subset of transceiving antennas and to issue instructions to a WLAN front end to operate with the first transceiving antenna.

20 Claims, 8 Drawing Sheets

(51) Int. Cl.
*H04W 84/12* (2009.01)
*H04W 88/06* (2009.01)

(58) Field of Classification Search
CPC ........ H04L 12/2697; H04L 1/243; H04J 3/14; H04M 3/244
See application file for complete search history.

(56) References Cited

U.S. PATENT DOCUMENTS

| | | | |
|---|---|---|---|
| 9,294,259 B2* | 3/2016 | Jalloul | .................... H04L 5/143 |
| 9,537,559 B1* | 1/2017 | Liu | ....................... H04B 7/0814 |
| 9,888,523 B2* | 2/2018 | Amini | .................... H04W 88/08 |
| 10,159,070 B2 | 12/2018 | Awoniyi-oteri | |
| 10,420,023 B2 | 9/2019 | Ramasamy | |
| 11,265,052 B1* | 3/2022 | Proejts | ................. H04B 7/0602 |
| 11,424,789 B1* | 8/2022 | Ramasamy | ........... H04B 17/318 |
| 11,601,186 B1* | 3/2023 | Ramasamy | ........... H04B 7/0602 |
| 2016/0165576 A1 | 6/2016 | Awoniyi-oteri | |
| 2018/0063031 A1* | 3/2018 | Wloczysiak | .......... H04W 40/02 |
| 2018/0091201 A1* | 3/2018 | Yang | .................... H04B 7/0602 |
| 2018/0288731 A1 | 10/2018 | Akula | |
| 2018/0367177 A1 | 12/2018 | Ramasamy | |
| 2019/0140340 A1 | 5/2019 | Ramasamy | |
| 2019/0140706 A1* | 5/2019 | Chang | ................... H04W 24/02 |
| 2020/0205062 A1 | 6/2020 | Azizi | |
| 2021/0211167 A1* | 7/2021 | Ramasamy | .......... H04B 7/0608 |
| 2022/0038392 A1* | 2/2022 | Wloczysiak | ......... H04B 1/0064 |
| 2022/0264681 A1* | 8/2022 | Labadie | ................ H01Q 1/2291 |
| 2023/0110141 A1* | 4/2023 | Ramasamy | .......... H01Q 1/2266 |
| | | | 370/252 |
| 2023/0118127 A1* | 4/2023 | Ramasamy | .......... H04B 7/0802 |
| | | | 375/267 |

FOREIGN PATENT DOCUMENTS

| | | | | |
|---|---|---|---|---|
| WO | 1997/008839 A2 | 3/1997 | | |
| WO | WO-2016089506 A1 * | 6/2016 | .......... | H04B 1/0064 |
| WO | 2018/064179 A1 | 4/2018 | | |

* cited by examiner

METHOD AND APPARATUS FOR WI-FI CONCURRENT DUAL HIGH BAND WITH ANTENNA SHARING

FIELD OF THE DISCLOSURE

The present disclosure generally relates to transceiving WWAN and WLAN data streams via a plurality of antennas in an information handling system. The present disclosure more specifically relates to selecting and switching among a plurality of transceiving antennas in an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, WLAN (e.g., WiFi), GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
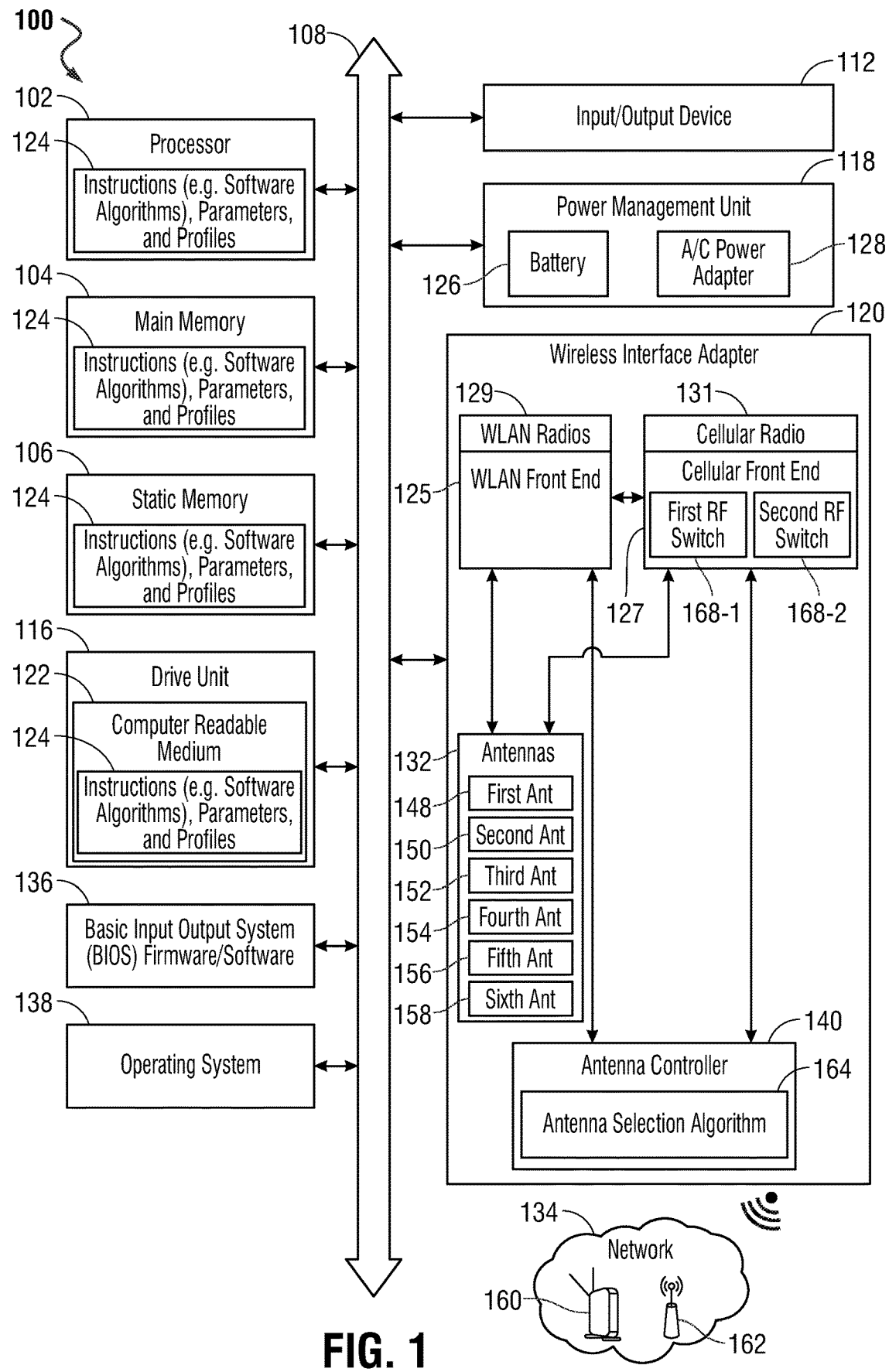
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Information handling systems including those that are mobile in embodiments of the present disclosure address this need by employing a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, 5G standards such as IMT-2020, 5G NR, LTE, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams to enhance bandwidth or reliability.

The system and method described herein, may execute an algorithm that initially determines whether a wireless connection is to be established. Where it is determined that operations of the information handling system are to implement a wireless connection, the information handling system may then determine the level of bandwidth and throughput to be used during this wireless connection. For example, the information handling system may determine the bandwidth and throughput to be used during the execution of a particular application such as an online gaming application or an email application. The information handling system, in an embodiment, may also initiate a sideband communication with one or more wireless networks (e.g., WWAN and WLAN networks) in order to determine characteristics of those available wireless networks such as available bandwidth, congestion statistics, throughput, available channels or bands, and operating radio frequencies, among other telemetry data obtained via this sideband communication. In an embodiment, this telemetry data may originate from a third-party who provides this data when the information handling system requests it via the sideband communication. This algorithm executed by the information handling system may continuously check for changes in the executed applications at the information handling system and the telemetry data so that an antenna controller may switch a switch to repurpose a pair of WWAN antennas operatively coupled to a cellular front end over to a Wi-Fi front end. Where the antenna controller switches the switch a concurrent first and second 2×2 MIMO WLAN connection or a 4×4 MIMO WLAN connection may be made with a WLAN network. Where the switch is not switched, the antenna controller may maintain four antennas operating, for example, as a 4×4 MIMO connection to a WWAN network with an original two Wi-Fi antennas operating as a 2×2 MIMO, concurrent dual band connection to the WLAN network.

Current configurations involving a plurality of antenna systems operating on a variety of RATs encounter potential problems associated with interference between each of the antennas, compliance with Federal Communications Commission (FCC) standard absorption rate (SAR) requirements across all antennas, variations in a received signal strength indicator (RSSI) levels, and base rate over range performance of the plurality of available antennas due to antenna radiation pattern coverage, available of networks to the information handling system to operatively couple to, and incompatibility between radio modems manufactured by different upstream devices, among other system operation and connection metrics. For example, a signal strength (e.g., as a detected RSSI) associated with a WLAN communication access point may be inferior to the signal strength associated with a WWAN communication access point. In another example, operation of one antenna as compared to another antenna within the information handling system may be impeded via a user's body part such that a radio frequency (RF) signal cannot be transmitted or received. Embodiments of the present disclosure address this issue by providing an antenna controller capable of switching from one set and type of antenna device to another based on specific absorption rate (SAR) data from a plurality of SAR sensors, RSSI indicators, system operation and connection metrics from the antenna controller executing a sideband serial messaging protocol, and configuration data descriptive of a configuration of the information handling system in order to increase the reliability of signal and transmission and reception of data across any type of network.

The SAR data, RSSI data, system operation and connection metrics, and configuration data may be used as input to an antenna selection algorithm used by the antenna controller to determine which of the plurality of antennas within the information handling system to use in order to communicate with any type of communication network. In an embodiment, the output may be a specific selection of antennas that can operate in an N×N multiple-in-multiple-out (MIMO) array configuration in order to increase the amount of data transmitted by and received at the information handling system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the antenna selection algorithm 164, and drive unit 116 (volatile (e.g., random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display. The video display in an embodiment may function as a liquid crystal display (LCD), an organic light emitting diode (OLED), a flat panel display, or a solid-state display. Additionally, the information handling system 100 may include an alpha numeric input device, such as a keyboard, and/or a cursor control device, such as a mouse, touchpad, or gesture or touch screen input device. The present specification further contemplates that any other input/output device 112 may be included for the user to interact with the information handling system 100. The information handling system 100 can also include a disk drive unit 116.

The network interface device shown as wireless interface adapter 120 can provide connectivity to a network 128, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point used to operatively couple the information handling system 100 to a network. In a specific embodiment, the network 134 may include cellular connections via one or more service providers 162 or a wireless access point 160 (Wi-Fi or WiGig), in some portion of certain embodiments through access ports through WWAN small cell base stations or macro-cellular wireless links. Connectivity may be via wired or wireless connection. Wireless interface adapter 120 may include one or more radio frequency (RF) subsystems with transmitter/receiver circuitry, modem circuitry, and one or more radio frequency front end circuits 125, 127, one or more wireless controller circuits, amplifiers, antennas 132 and other circuitry. In an embodiment, a WLAN antenna radio 129 and cellular antenna radio 131 may be operatively coupled to a front end such as a WLAN front end 125 and a cellular front end 127 as described herein. Each of the WLAN front end 125 and cellular front end 127 may include one or more antenna ports used for wireless communications via multiple radio access technologies. These one or more antenna ports may allow for the operative coupling of an antenna 132 to the WLAN antenna radio 129 and the cellular antenna radio 131 via the WLAN front end 125 and cellular front end 127, respectively. The WLAN antenna radio 129 and cellular antenna radio 131 may include any circuitry that may include a number of layers including a medium access control layer, a physical layer, and an RF transceiver part that work together to provide an oscillation current to any of the antennas 132 coupled thereto.

Each of the WLAN antenna radio 129 and cellular antenna radio 131 may communicate using one or more wireless technology protocols. Although two radios 129 and 131 are shown in FIG. 1, any number of radios are contemplated and the principles described herein may be applied similarly in those additional radios. The cellular antenna radio 131 may contain individual subscriber identity module (SIM) profiles for each technology service provider and their available protocols for subscriber-based radio access technologies such as cellular LTE communications.

The wireless interface adapter 120, also known as a wireless interface device, may also include antennas 132 which may include any number of tunable antenna systems for use with the system and methods disclosed herein. In the embodiment shown in FIG. 1, the antennas 132 may include a first antenna 148, a second antenna 150, a third antenna 152, a fourth antenna 154, a fifth antenna 156, and a sixth antenna 158. However, the present specification contemplates that the antennas 132 may include more or less of the number of antennas 148, 150, 152, 154, 156, 158 shown in FIG. 1. Additional antenna system modification circuitry (not shown) may also be included with the wireless interface adapter 120 to implement concurrent signal transmissions as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or under Wi-Fi 802.11 standards for WLAN operation. In some embodiments, the shared, wireless communication band may be transmitted through one or a plurality of antennas. In a specific embodiment described herein, the shared, wireless communication band may be transmitted through a plurality of antennas used to operate in the N×N MIMO array configuration where multiple antennas 148, 150, 152, 154, 156, 158 are used to exploit multipath propagation. Other shared communication frequency bands are contemplated for use with the embodiments of the present disclosure as well and the present specification contemplates the use of those other shared communication frequency bands. In an embodiment, the antennas 148, 150, 152, 154, 156, 158 formed into the N×N MIMO array configuration may operate at a 2×2 and 2×2 dual channel high band or, alternatively, in a 4×4 single channel high band. The operations of the WLAN front end 125 and the cellular front end 127 used to accomplish these two MIMO operations are further described herein.

In other aspects, the information handling system 100, operating as a mobile information handling system may, may operate a plurality of wireless interface adapters 120 for concurrent RF subsystem operation in one or more wireless communication bands. The plurality of wireless interface adapters 120 may further share a wireless communication band or operate in nearby wireless communication bands in some disclosed embodiments. For example, in some embodiments, some of the antennas 148, 150, 152, 154, 156, 158 may implement harmonics, parasitic elements, or other effects may impact wireless link operation when a plurality of wireless links are operating concurrently as in some of the presently described embodiments. The WLAN antenna radio 129 and cellular antenna radio 131 transmission or reception operates under the wireless interface adapter 120 with an antenna controller 140 to execute an antenna selection algorithm 164 and potentially make antenna system adjustments according to embodiments of the present disclosure.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Wireless interface adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax. It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz or 5 GHz bands for example. In additional examples, WWAN carrier licensed bands may operate at frequency bands of approximately 700 MHz, 800 MHz, 1900 MHz, or 1700/2100 MHz as well as others in the new radio frequency range 1 (NRFR1) or NFRF2 bands, and other known bands. In the example embodiment, mobile information handling system 100 includes both unlicensed wireless RF communication capabilities as well as licensed wireless RF communication capabilities. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems including transmitters and wireless controllers for connecting via a multitude of wireless links. In an example embodiment, an information handling system 100 may have an antenna system transmitter for 5G small cell WWAN, Wi-Fi WLAN or WiGig connectivity and one or more additional antenna system transmitters for macro-cellular communication. The RF subsystems may include wireless controllers to manage authentication, connectivity, communications, power levels for transmission, buffering, error correction, baseband processing, and other functions of the wireless interface adapter 120.

In an embodiment, the wireless interface adapter 120, via instructions from the antenna controller 140, initiates a sideband communication with any network available to the information handling system. For example, the wireless interface adapter 120 may cause the WLAN front end 125 (e.g., Wi-Fi front end) to search for a WLAN network (e.g., via a wireless access point 160) and initiate a sideband communication with that WLAN network. In another example, the wireless interface adapter 120 may, alternatively or additionally cause the WWAN front end (e.g., cellular front end 127) to search for a WWAN network (e.g., via a base station 162) and initiate a sideband communication with that WWAN network. This sideband communication may request from a plurality of sources any telemetry data associated with the networks available to the information handling system to be operatively coupled to. In an example embodiment, the antenna controller may execute and out-of-band (OOB) communication with a WLAN or WWAN network or a Wi-Fi or WWAN connection. This may establish a sideband communication with a backend management server for the information handling system such as one executing an information handling system management application such as Dell Optimizer®. In this embodiment, the information handling system management application may manage one or more information handling systems operatively coupled to the backend server. This sideband communication may access the backend server or other remote information handling system to obtain sideband data traffic communication telemetry data. This sideband data traffic communication telemetry data may include congestion data, traffic data, data bandwidth, and frequency bandwidth, among other data described herein that is associated with those wireless communication channels available to the information handling system. In an embodiment, the backend server operating the information handling system management application (e.g., Dell Optimizer®) may be under contract with a number of service providers such as cellular service providers or internet service providers to access the sideband data traffic communication telemetry data associated with their respective services. For example, the backend server may have a contract or agreement with a cellular network provider to be provided with access to the sideband data traffic communication telemetry data associated with the operations of a WWAN operated by the cellular network provider. In an embodiment, the sideband communication may access sources at the various networks that are operated by any third party that maintains telemetry data such as the congestion data, transmission speeds, data bandwidth, frequency bandwidth, and data throughput among other data. Once received via the sideband communication, the backend server executing the information handling system management application (e.g., Dell Optimizer®) may provide this data to the information handling system 100 and the antenna controller 140.

The antennal controller 140 may also gather information related to the application being executed on the information handling system 100 from the processor 102 or other processing device. The application being executed by the information handling system 100 may use the network 134 to transmit and receive data. These applications may include, for example, a music streaming application, an audio/video streaming application, a videoconferencing application, an email application, an online gaming application, among others. The execution of each of these types of applications may require more or less bandwidth, data throughput, and signal strength that may or may not be available to the information handling system via a certain WLAN or WWAN connection. For example, a gaming application may require a relatively high data throughput. In this example, the antenna controller 140, per execution of the antenna selection algorithm, may indicate that a 5G communication may be established via the cellular front end 127 and a 5 GHz or higher WLAN connection may be established via a WLAN front end 125. Based on whether either of these connections would better benefit the operation of the application being executed, the antenna controller 140 may execute the antenna selection algorithm 164 to include this data as input in order to select the appropriate antenna(s) to use according to the embodiments described herein.

The information handling system 100 may also, via the WLAN antenna radio 129 and cellular antenna radio 131 of the wireless interface adapters 120, measure various metrics relating to wireless communication and provide that data to operation an antenna selection algorithm 164 as described in the present disclosure. For example, the antenna controller 140 and WLAN antenna radio 129 and cellular antenna radio 131 may manage detecting and measuring received signal strength levels, bit error rates, signal to noise ratios, latencies, jitter, and other metrics relating to signal quality and strength of any of a plurality of communication networks made available to the information handling system 100.

In an embodiment, the antenna controller 140 of the wireless interface adapter 120 may manage one or more RF subsystems to manage transmission power levels which directly affect RF subsystem power consumption as well as transmission power levels from the plurality of antennas 132. The transmission power levels from the antennas 132 may be relevant to specific absorption rate (SAR) safety limitations for transmitting mobile information handling systems. To control and measure power consumption via a radio, the radio may control and measure current and voltage power that is directed to operate one or more antennas 132.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more application programs, and basic input/output system (BIOS) firmware/software 136. BIOS firmware/software 136 functions to initialize information handling system 100 on power up, to launch an OS 138, and to manage input and output interactions between the OS 138 and the other elements of information handling system 100. Again, the antennal controller 140 may also gather information related to the application being executed on the information handling system and which use the network to transmit and receive data via any given wireless links described herein. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Application programs 124 and BIOS firmware/software 136 can each be implemented as single programs, or as separate programs carrying out the various features as described herein.

During operation of the information handling system 100, the antenna controller 140 may communicate with the processor 102 to in order to determine a telemetry data descriptive of resource requirements associated with an executed wireless application executed on the information handling system. In an embodiment, this telemetry data includes wireless application telemetry originating from services connected to notifying the antenna controller 140 of resource requirements to deliver in the intended quality of service (QoS). In an embodiment, an optimizing service such as a Dell Optimizer® service may be installed on the information handling system to survey applications being executed to determine each applications' wireless connection needs in order to meet certain data bandwidth needs of those applications. As described herein, the quality of service for the application is considered during execution of the antenna selection algorithm 164 by the antenna controller 140 and is used as input, along with the sideband communication with the WWAN and WLAN networks or congestion of these networks, to the antenna selection algorithm 164.

Again, the wireless interface adapter 120, via instructions from the antenna controller 140, initiates a sideband communication with any network available to the information handling system. For example, the wireless interface adapter 120 may cause the WLAN front end 125 (e.g., Wi-Fi front end) to search for a WLAN network (e.g., via a wireless access point 160) and initiate a sideband communication with that WLAN network. In another example, the wireless interface adapter 120 may, alternatively or additionally cause the WWAN front end (e.g., cellular front end 127) to search for a WWAN network (e.g., via a service provider 162) and initiate a sideband communication with that WWAN network. This sideband communication may request from a plurality of sources any telemetry data associated with the networks available to the information handling system to be operatively coupled to. In an embodiment, the sideband communication may access sources at the various networks that are operated by a third party that maintains telemetry data such as congestion data, transmission speeds, data bandwidth, frequency bandwidth, and data throughput among other data.

The information handling system 100 may also gather data at the antenna controller 140 cellular telemetry data descriptive of the signal strength and frequency channel available at the cellular front end 127. In an embodiment, a cellular front end 127 may be operatively coupled to the antenna controller 140 in order to provide the cellular telemetry data. This telemetry data gathered from the cellular front end 127 may be gathered periodically in order to better purpose and repurpose the antennas 148, 150, 152, 154, 156, 158 as described herein.

The information handling system 100 may also gather data at the antenna controller 140 WLAN telemetry data descriptive of the signal strength and frequency channel available at the WLAN front end 125. In an embodiment, a WLAN front end 125 may be operatively coupled to the antenna controller 140 in order to provide the WLAN telemetry data. This telemetry data gathered from the WLAN front end 125 may be gathered periodically in order to better purpose and repurpose the antennas 148, 150, 152, 154, 156, 158 as described herein.

When this telemetry data from the sideband communications with wireless network systems, the WLAN front end 125 and cellular front end 127 and the wireless application telemetry data from the processor and Dell Optimizer® service is received by the antenna controller 140, the antenna controller 140 may execute an antenna selection algorithm 164 used to determine which, how many, and when any of the antennas 148, 150, 152, 154, 156, 158 are to be repurposed according to the embodiments described herein.

In an embodiment, the WLAN front end 125 may have the ability to concurrently transceive data in high bands and low bands. In a specific embodiment, the chipset of the WLAN front end 125 (e.g., a chipset of a Wi-Fi front end) may include a first radio and a second radio formed on a single chipset. In this example embodiment, the first radio on the chipset may provide high-band (HB) signals to a first diplexer that supports concurrent low band (LB)+HB and ultra-high-band (UHB) frequency transmissions and receptions at a first antenna 148. The first radio may also provide HB signals to a second diplexer that also supports concurrent low LB+HB and UHB frequency transmissions and receptions at a second antenna 150. In this embodiment, the WLAN front end 125 includes a second radio that provides LB signals to the first diplexer that supports concurrent LB+HB and UHB frequency transmissions and receptions at the first antenna 148. The second radio also provides LB signals to the second diplexer that supports concurrent LB+HB and UHB frequency transmissions and receptions at the second antenna 150. During operation of the WLAN front end 125 as described, the dual band operation is limited to LB+HB concurrent transmissions and receptions within no concurrent dual HB transmission and receptions available.

The present WLAN front end 125 chipset may further utilize HB ports associated with the second radio in order to selectively provide an additional HB transmission signals to one or more antennas associated with the cellular front end 127. In an embodiment, the cellular front end 127 may have a third antenna 152, a fourth antenna 154, a fifth antenna 156, and a sixth antenna 158 to operate the cellular front end 127 in a 4×4 MIMO cellular transmission. Based, at least, on the received wireless application telemetry data and telemetry data from the WLAN front end 125 and cellular front end 127, the antenna controller 140 may operatively couple at least one of the antennas associated with the cellular front end 127 (e.g., antennas 152, 154, 156, 158) to the extra HB ports of the second radio of the WLAN front end 125 chipset.

In an embodiment, the cellular front end 127 may be operatively coupled to four antennas such as the third antenna 150, fourth antenna 154, fifth antenna 156, and sixth antenna 158 to operatively couple the information handling system to a base station operated by a service provider 162. This may be a default state of the operation of, at least, the third antenna 150 and fourth antenna 154 allowing the cellular front end 127 to operate in a 4×4 MIMO state. During operation and based on the receive data descriptive of data traffic, wireless connection states, and telemetry data via a sideband communication, the antenna controller 140 may operatively couple the extra HB ports of the second radio of the WLAN front end 125 to two of the antennas associated with the cellular front end 127. In this embodiment, the WLAN front end 125 may use these two additional antennas to form a two 2×2 dual channel HB group of transceiving antennas or to form a 4×4 single channel HB group of transceiving antennas. This increases the speed of data transmitted and received by the WLAN front end 125 from 3.66 Gbps to 4.8 Gbps. This may be done when the antenna controller 140 has determined, based on the wireless application telemetry data and telemetry data from the WLAN front end 125 and cellular front end 127, that the data transmission and reception speeds of the WLAN front end 125 should be prioritized.

In order to operatively and selectively switch the antennas repurposed from the cellular front end 127 to the WLAN front end 125, the repurposed antennas may be operatively coupled to an RF switch 168-1, 168-2. The RF switches 168-1, 168-2 may be operatively coupled to a cellular port of the cellular front end 127 and to an HB port of the second radio of the WLAN front end 125. As such, when the antenna controller 140 determines that the wireless hardware sideband telemetry, the wireless application telemetry data, and the telemetry data from the cellular front end 127 and WLAN front end 125 indicates that two of the antennas associated with the cellular front end 127 should be repurposed, the antenna controller 140 may access these RF switches 168-1, 168-2 at the WLAN front end 125 or cellular front end 127 to switch the input at these antennas from the cellular front end 127 to the WLAN front end 125.

The repurposing of the antennas 148, 150, 152, 154, 156, 158 as described herein allows for concurrent dual HB WLAN transmissions (e.g., Wi-Fi) with a 4×4 antenna support thereby sharing 4G/5G cellular antennas with the WLAN front end 125. The antenna selection algorithm 164 described herein may use the gathered the wireless hardware sideband telemetry, the wireless application telemetry data, and telemetry data from the WLAN front end 125 and cellular front end 127 to map antenna resources to the WLAN front end 125 and cellular front end 127 according to the embodiments described herein. This wireless application telemetry data and telemetry data from the WLAN front end 125 or cellular front end 127 may be gathered using a sideband communication that operates concurrently with the transmission and reception of data between the information handling system 100 and the network 134. The present antenna controller 140 and associated functions of the cellular front end 127 and WLAN front end 125 allow for a 4×4 Wi-Fi antenna or 4×4 cellular antenna enablement using six antennas 148, 150, 152, 154, 156, 158 that may be repurposed per the data transmission needs of the information handling system 100. The system and methods described herein enable ultrawide aggregated Wi-Fi bandwidth via dual high band concurrency there by enabling wireless flexibility at the information handling system 100.

In an embodiment, the wireless network 134 may have a wireless mesh architecture in accordance with mesh networks described by the wireless data communications standards or similar standards in some embodiments but not necessarily in all embodiments. The wireless interface adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. For example, code instructions of an antenna selection algorithm 164 may be executed in whole or in part by the antenna controller 140. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 134. Further, the instructions 124 may be transmitted or received over the network 134 via the network interface device or wireless interface adapter 120.

Wireless interface adapter 120 represents a network interface controller (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. Wireless interface adapter 120 in an embodiment may operably connect to a network 134. Connection to network 134 may be wired or wireless.

The network interface device shown as wireless interface adapter 120 can provide connectivity to a network 134, such as a wide area network (WAN), a local area network (LAN), wireless local area network (WLAN), a wireless personal area network (WPAN), a wireless wide area network (WWAN), or other network. Connectivity may be via wired or wireless connection. Wireless interface adapter 120 may include an adaptive massive MIMO multiplexer with transmitter/receiver circuitry, wireless controller circuitry, amplifiers and other circuitry for wireless communications. The wireless interface adapter 120 may also include antennas 132 which may be tunable antenna systems for use with the system and methods disclosed herein. The antenna controller 140 may also include wireless controllers to manage authentication, connectivity, communications, power levels for transmission, buffering, error correction, baseband processing, and other functions of the wireless interface adapter 120.

The information handling system 100 can include a set of instructions 124 that can be executed to cause the computer system to execute various software or hardware application s or to perform any one or more of the methods or computer-based functions disclosed herein. For example, instructions 124 may execute software agents or other aspects or components of multiple types of applications with varying data service requirements including streaming applications, gaming applications, virtual applications, or other applications that may interfere with the wireless adapter 120 for wireless data communications. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 140 to perform the processes described herein. Similarly, main memory 104 and static memory 106 may also contain a computer-readable medium for storage of one or more sets of instructions, parameters, or profiles 124 including one or more antenna selection algorithms 164. The disk drive unit 116 and static memory 106 also contain space for data storage. Further, the instructions 124 may embody one or more of the methods or logic as described herein. For example, instructions relating to the dynamic switching of the antennas 148, 150, 152, 154, 156, 158 as described herein may be stored here. In a particular embodiment, the instructions, parameters, and profiles 124 may reside completely, or at least partially, within the main memory 104, the static memory 106, and/or within the disk drive 116 during execution by the processor 102 of information handling system 100. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
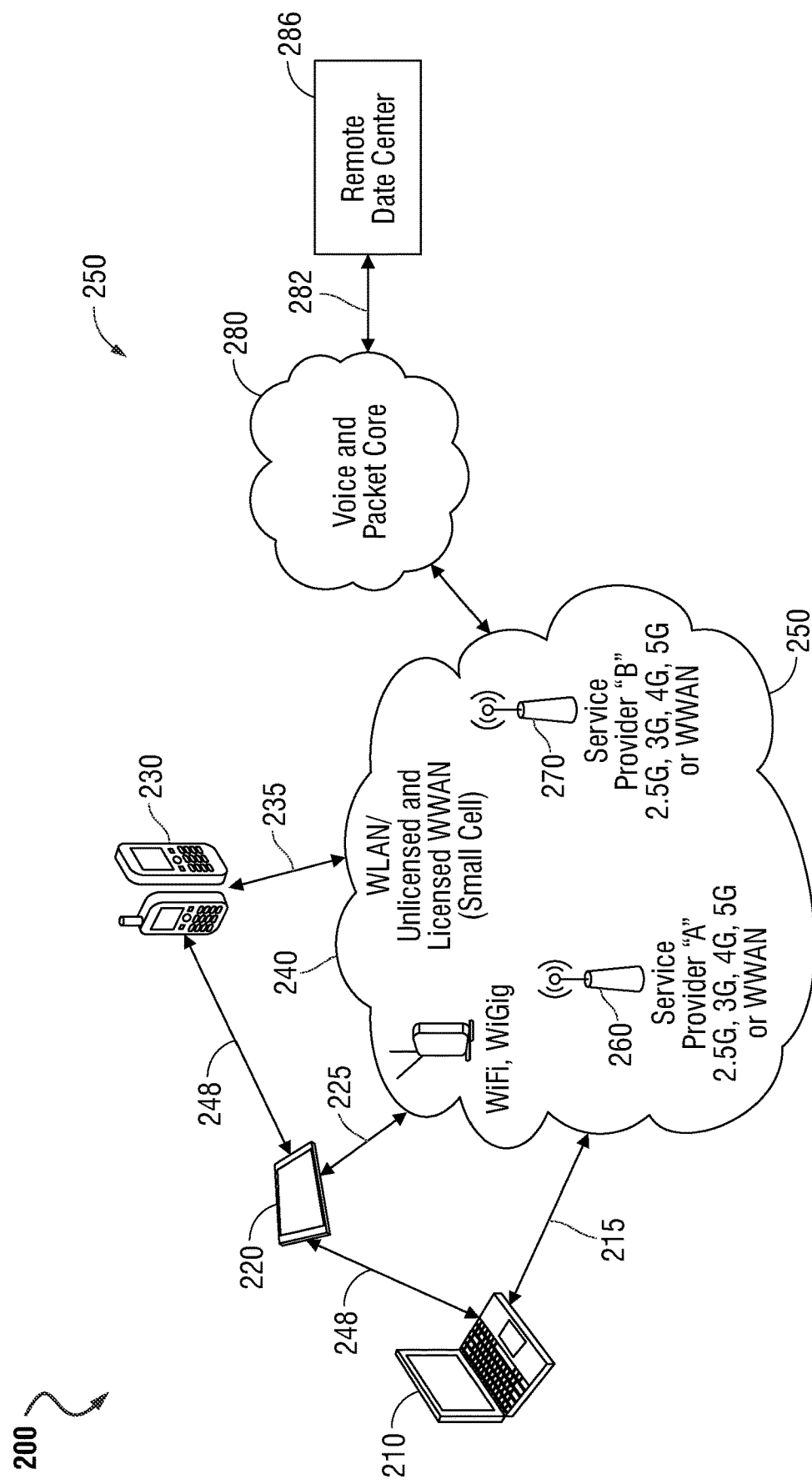
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, and system operation and connection metrics associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards and may variously include WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. In an embodiment, some radio frequency communication bands may be shared. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band in example embodiments and the antenna controllers (e.g., 140 FIG. 1) of each of the information handling systems 210, 220, 230 may adjust their network connections and antennas used to operatively couple to those networks based on this data descriptive of the networks. WLAN, for example, may also operate at a 2.4 GHz band. WWAN may operate in a number of bands, some of which are propriety but may include a wireless communication frequency band at approximately 2.5 GHz band in another example. In additional examples, WWAN carrier licensed bands may operate at frequency bands of approximately 700 MHz, 800 MHz, 1900 MHz, or 1700/2100 MHz for example as well. It is understood that any number of available channels may be available under the 5 GHz shared communication frequency band for WLAN. WLAN, in another example, may also operate at various channels in a 2.4 GHz band. WWAN may operate in a number of bands, some of which are proprietary but may include a wireless communication frequency band at approximately 2.5 GHz or 5 GHz bands for example. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. In additional examples, WWAN carrier licensed bands may operate at frequency bands of approximately 700 MHz, 800 MHz, 1900 MHz, or 1700/2100 MHz as well as the NRFR1 and NFRF2, bands, and other known bands in sub-6 GHz or greater than 6 GHz bands. In further examples, WLAN communications may include those frequencies associated with the execution of a Wi-Fi 6 or 6E standards (IEEE 802.11ax standards) such as frequencies meeting and exceeding 6 GHz. In the example embodiment, mobile information handling systems 210, 220, and 230 include both unlicensed wireless RF communication capabilities as well as licensed wireless RF communication capabilities due to the capabilities of the antennas (e.g., 148, 150, 152, 154, 156, 158 in FIG. 1) described herein. For example, licensed wireless RF communication capabilities may be available via a subscriber carrier wireless service. With the licensed wireless RF communication capability, WWAN RF front end may operate on a licensed WWAN wireless radio with authorization for subscriber access to a wireless service provider on a carrier licensed frequency band.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands or plural wireless protocols according to embodiments of the present disclosure. Example competing protocols may be local wireless network access protocols such as Wi-Fi/WLAN, WiGig, and small cell WWAN in an unlicensed, shared communication frequency band. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN and which may operate within the same, adjacent, or otherwise interfering communication frequency bands. The antenna or antennas may be transmitting antennas that include high-band, medium-band, low-band, and unlicensed band transmitting antennas in embodiments herein. The antennas may cooperate with other antennas in a N×N MIMO array configuration according to the embodiments described herein. Alternatively, embodiments may include a single transceiving antenna capable of receiving and transmitting, and/or more than one transceiving antennas. Each of the antennas included in the information handling system 100 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through WWAN small cell base stations such as in network 240 or through a service provider tower such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

As described herein, the information handling systems 210, 220, and 230 may concurrently communicate with a wireless local network 240 and a WWAN small cell base stations or macro-cellular network 250 using the antennas within each of the information handling systems 210, 220, and 230. For example, each of the information handling systems 210, 220, and 230 may be similar to the information handling system described in connection with FIG. 1 with more than one antenna associated with a WLAN front end and more than one antenna associated with the cellular front end. The association of those antennas of the cellular front end may be dynamically associated/disassociated with and operatively coupled to the Wi-Fi front end if and when the antenna controller determines that, based on the telemetry data from the sideband communications with wireless network systems, the WLAN front end and cellular front end, and the wireless application telemetry data from the processor and Dell Optimizer® service, indicates that the switches described herein should be switched. In a first antenna association, these multiple antennas may be used to create a 2×2 MIMO LB+HB concurrent radio transmissions from the WLAN front end and a 4×4 MIMO HB radio transmissions from the cellular front end 127 in a first antenna arrangement. This arrangement may be based on the execution of the antenna selection algorithm by the antenna controller as described. In this arrangement, the information handling systems 210, 220, and 230 may communicate with the macro-cellular networks 250 using the 5G standards. Additionally, in this arrangement, the information handling systems 210, 220, and 230 may communicate with the wireless local network 240 at a 2.4 GHz frequency and, concurrently, at 5 GHz or new 6 GHz (802.11ax IEEE standards) frequencies.

As described herein, these multiple antennas may also be used to create two, 2×2 dual channel HB group of transceiving antennas or to form a 4×4 single channel HB group of transceiving antennas with any remaining antennas associated with the cellular front end being operated at a 2×2 4G transmitting and receiving antenna. Again, this is done when the antenna controller determines that, based on the telemetry data from the sideband communications with wireless network systems, the WLAN front end and cellular front end, and the wireless application telemetry data from the processor and Dell Optimizer® service, indicates that the switches described herein should be switched to repurpose two WLAN antennas. As output, the antenna controller may determine to operatively switch two antennas associated with the cellular front end by accessing a number of switches associated with those antennas and operatively coupling those antennas to a HB port at, for example, a second radio of the WLAN front end chipset. In this arrangement, the information handling systems 210, 220, and 230 may communicate with the macro-cellular networks 250 using the 4G standards and transmitting data a speed of 1 Gbps. Additionally, in this arrangement, the information handling systems 210, 220, and 230 may communicate with the wireless local network 240 with data transmission and reception speeds of 4.8 Gbps using a 5 GHz frequency or a 6 GHz frequency. In an alternative embodiment, the information handling systems 210, 220, and 230 may engage in concurrent, multiple wireless connections with, for example, a wireless access point and a wireless display device or docking station.

Figure 3:
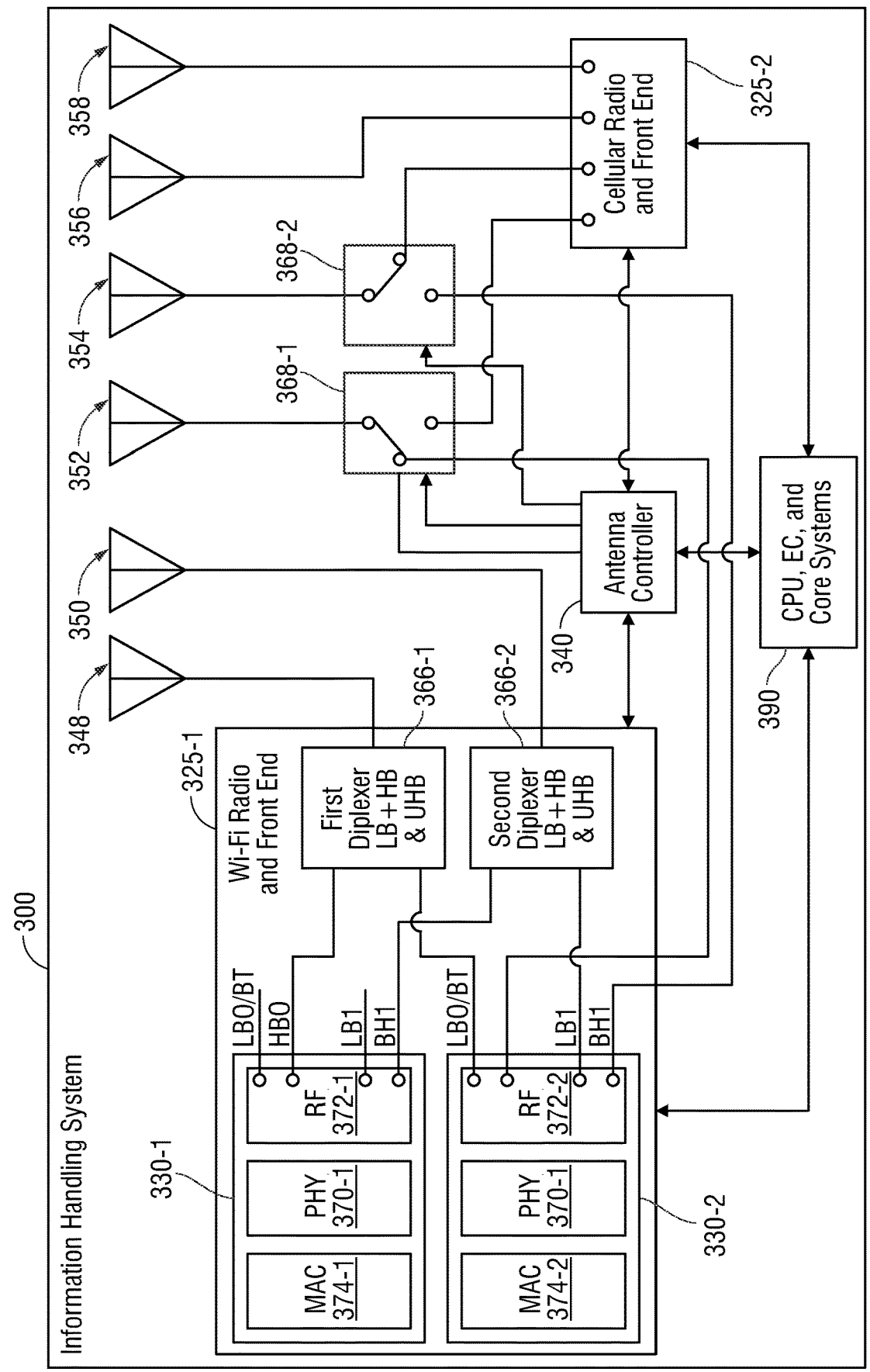
FIG. 3 is a block diagram illustrating an information handling system including radio and antenna systems according to another embodiment of the present disclosure.

FIG. 3 is a block diagram illustrating an information handling system with an antenna controller executing an antenna selection algorithm according to another embodiment of the present disclosure. In this embodiment, the information handling system 300 may also include similar components as those described in connection with FIG. 1 such as a processor, a PMU, a BIOS, an OS, various input/output devices, among other components not shown in FIG. 3. In an embodiment, the information handling system 300 may include a central processing unit (CPU, embedded controller (EC), and core systems 390. The CPU may be any type of processor that executes computer code such as a BIOS and OS providing the user with a user interface to operate the information handling system 300 as described herein. The EC may be any additional processor or processing resources used by the CPU to interface with the antenna controller 340 in order to flash any instructions to the antenna controller 340 to achieve the functionality of the antenna controller 340 described herein.

The information handling system 300 may include an antenna controller 340 operatively coupled to, in this embodiment, six different antennas 348, 350, 352, 354, 356, 358 via one of a Wi-Fi antenna radio and front end 325-1 or a cellular antenna radio and front end 325-2. In the embodiment shown in FIG. 3, a first antenna 348 and a second antenna 350 may be associated with the Wi-Fi antenna radio and front end 325-1 while a third antenna 352, a fourth antenna 354, a fifth antenna 356 and a sixth antenna 358 is associated with a cellular antenna radio and front end 325-2. In this embodiment, the Wi-Fi antenna radio and front end 325-1 is shown to be operatively coupled to the first antenna 348 and second antenna 350 and may be operatively couplable to the third antenna 352 and fourth antenna 354 based on data traffic, wireless connection states, and telemetry data from the Wi-Fi antenna radio and front end 325-1 and cellular antenna radio and front end 325-2 as described herein. Again, some of this data such as the data traffic, congestion, bandwidth, and channel/band data may be obtained by either of the Wi-Fi antenna radio and front end 325-1 or cellular antenna radio and front end 325-2 via the sideband communication.

In an embodiment, the Wi-Fi antenna radio and front end 325-1 may have the ability to concurrently transceive data in high bands and low bands. In a specific embodiment, the chipset of the Wi-Fi antenna radio and front end 325-1 may include a first radio 330-1 and a second radio 330-2. In this example embodiment, the first radio 330-1 of the chipset forming the Wi-Fi radio and front end 325-1 may provide high-band (HB0) signals to a first diplexer 366-1 that supports concurrent low band (LB)+HB and ultra-high-band (UHB) frequency transmissions and receptions at a first antenna 348. The first radio 330-1 may also provide HB signals (e.g., HB1) to a second diplexer 366-2 that also supports concurrent low LB+HB and UHB frequency transmissions and receptions at a second antenna 350. In this embodiment, the Wi-Fi antenna radio and front end 325-1 includes a second radio 330-2 that provides LB signals (e.g., LB0/BT; low band 0/Bluetooth) to the first diplexer 366-1 that supports concurrent LB+HB and UHB frequency transmissions and receptions at the first antenna 348. The second radio 330-2 also provides LB signals (e.g., LB1) to the second diplexer 366-2 that supports concurrent LB+HB and UHB frequency transmissions and receptions at the second antenna 350. During operation of the Wi-Fi antenna radio and front end 325-1 as described, the dual band operation is limited to LB+HB concurrent transmissions and receptions within no concurrent dual HB transmission and receptions available when the first antenna 348 and second antenna 350 are the only antennas operatively coupled to the Wi-Fi front end 325-1.

The present Wi-Fi antenna radio and front end 325-1 chipset may further utilize HB ports associated with the second radio 330-2 in order to selectively provide an additional HB transmission signals (e.g., HB0 and HB1) to one or more antennas associated with the cellular front end 325-2. In an embodiment, the cellular antenna radio and front end 325-2 may have a third antenna 352, a fourth antenna 354, a fifth antenna 356, and a sixth antenna 358 to typically operate the cellular antenna radio and front end 325-2 in a 4×4 MIMO cellular transmission. Based, at least, on the received data traffic, wireless application telemetry data, and telemetry data from the Wi-Fi antenna radio and front end 325-1 and cellular front end 325-2, the antenna controller 340 may operatively couple at least one of the antennas associated with the cellular antenna radio and front end 325-2 (e.g., antennas 352, 354, 356, 358) to be re-purposed for the extra HB ports of the second radio 330-2 of the Wi-Fi antenna radio and front end 325-1 chipset.

In a specific embodiment, the antenna controller 340 may operatively couple the extra HB ports of the second radio 330-2 of the Wi-Fi antenna radio and front end 325-1 to two of the antennas typically associated with the cellular antenna radio and front end 325-2 via RF switches 368-1 and 368-2. In this embodiment, the Wi-Fi antenna radio and front end 325-1 may use these two additional antennas to form a 2×2+2×2 dual channel HB group of transceiving antennas or to form a 4×4 single channel HB group of transceiving antennas for WLAN. For example, Wi-Fi 6 and 6E may be able to support 4×4 Wi-Fi link aggregation in Wi-Fi antenna radio and front end 325-1 under IEEE 802.11ax. This may increase the speed of data transmitted and received by the Wi-Fi antenna radio and front end 325-1 from 3.66 Gbps to 4.8 Gbps. This may be done when the antenna controller 340 has determined, based on the data traffic, the wireless application telemetry data, and telemetry data from the Wi-Fi antenna radio and front end 325-1 and cellular front end 325-2, that the data transmission and reception speeds of the Wi-Fi antenna radio and front end 325-1 should be increased to support data needs and use of Wi-Fi communications.

In order to operatively and selectively switch the antennas repurposed from the cellular antenna radio and front end 325-2 to the Wi-Fi front end 325-1, the repurposed antennas may be operatively coupled to one or more RF switches 368-1, 368-2. The RF switches 368-1, 368-2 may be operatively coupled to a cellular port of the cellular antenna radio and front end 325-2 and a HB port of the second radio 330-2 of the Wi-Fi front end 325-1. As such, when the antenna controller 340 determines that the wireless application telemetry data and the telemetry data from the cellular antenna radio and front end 325-2 and Wi-Fi antenna radio and front end 325-1 indicates that two of the antennas associated with the cellular antenna radio and front end 325-2 should be repurposed, the antenna controller 340 may access these RF switches 368-1, 368-2 to switch the input at these antennas from the cellular antenna radio and front end 325-2 to the Wi-Fi front end 325-1. As shown in FIG. 3, the antenna controller 340 selectively couples the third antenna 352 to the Wi-Fi antenna radio and front end 325-1 by accessing a first switch 368-1 and switching the output from the cellular antenna radio and front end 325-2 to the third antenna 352 to output from the Wi-Fi front end 325-1. Additionally, the antenna controller 340 selectively couples the fourth antenna 354 to the Wi-Fi antenna radio and front end 325-1 by accessing a second switch 368-2 and switching the output from the cellular antenna radio and front end 325-2 to the fourth antenna 354 to output from the Wi-Fi front end 325-1. During this time, the antenna controller 340 may also provide data signals to the Wi-Fi radio and front end 325-1 to instruct the Wi-Fi radio and front end 325-1 to operate under one of a 2×2+2×2 dual channel HB group of transceiving antennas or to form a 4×4 single channel HB group of transceiving antennas for WLAN. In an embodiment, the first switch 368-1 and second switch 368-2 may be combined into a single switch that automatically switches both the third antenna 352 and fourth antenna 354 from being operatively coupled to the cellular antenna radio and front end 325-2 and, instead, to the Wi-Fi front end 325-1.

The repurposing of the antennas 352, 354 as described herein allows for concurrent dual HB WLAN transmissions (e.g., Wi-Fi) with a 4×4 antenna support thereby sharing 4G/5G cellular antennas with the Wi-Fi front end 325-1. The antenna selection algorithm described herein may use the gathered data traffic information, wireless application telemetry data, and telemetry data from the Wi-Fi antenna radio and front end 325-1 and cellular antenna radio and front end 325-2 to map antenna resources to the Wi-Fi antenna radio and front end 325-1 and cellular antenna radio and front end 325-2 according to the embodiments described herein. The data associated with any available wireless networks such as available bandwidth, congestion statistics, throughput, available channels or bands, and operating radio frequencies, among other characteristics (aka traffic data) may be gathered using a sideband communication that operates concurrently with the transmission and reception of data between the information handling system 300 and a network. In an example embodiment, the antenna controller 340 may execute an out-of-band (OOB) communication with a WLAN or WWAN network or a Wi-Fi or WWAN connection. This may establish a sideband communication with a backend management server (not shown) for the information handling system such as one executing an information handling system management application such as Dell Optimizer®. In this embodiment, the information handling system management application may manage one or more information handling systems operatively coupled to the backend server. This sideband communication may access the backend server to obtain sideband data traffic communication telemetry data. This sideband data traffic communication telemetry data may include congestion data, traffic data, data bandwidth, and frequency bandwidth, among other data described herein that is associated with those wireless communication channels available to the information handling system. In an embodiment, the backend server operating the information handling system management application (e.g., Dell Optimizer®) may be under contract with a number of service providers such as cellular service providers or internet service providers to access the sideband data traffic communication telemetry data associated with their respective services. For example, the backend server may have a contract or agreement with a cellular network provider to be provided with access to the sideband data traffic communication telemetry data associated with the operations of a WWAN operated by the cellular network provider. In an embodiment, the sideband communication may access sources at the various networks that are operated by any third party that maintains telemetry data such as the congestion data, transmission speeds, data bandwidth, frequency bandwidth, and data throughput among other data. Once received via the sideband communication, the backend server executing the information handling system management application (e.g., Dell Optimizer®) may provide this data to the information handling system 100 and the antenna controller 140.

As described herein, this telemetry data may also originate from any third-party who provides this data when the information handling system requests it via the sideband communication. Additionally, the information handling system may determine the bandwidth and throughput to be used during the execution of a particular application such as an online gaming application or an email application referred herein to as the wireless application telemetry. Telemetry data associated with the Wi-Fi antenna radio and front end 325-1 and cellular antenna radio and front end 325-2 is further gathered periodically in order to better repurpose the antennas (e.g., 352, 354). The present antenna controller 340 and associated functions of the cellular antenna radio and front end 325-2 and Wi-Fi antenna radio and front end 325-1 allow for a 4×4 Wi-Fi antenna and 4×4 cellular antenna enablement using six antennas 348, 350, 352, 354, 356, 358 that may be repurposed per the data transmission needs of the information handling system 300. The system and methods described herein enable ultrawide aggregated Wi-Fi bandwidth via dual high band concurrency thereby enabling wireless flexibility at the information handling system 300.

In an embodiment, the first radio 330-1 and second radio 330-2 may each include a number of layers including media access control (MAC) sublayer 374-1, 374-2, a physical layer 370-1, 370-2, and an RF transceiver part 372-1, 372-2. The MAC sublayer (e.g., application layer) 374-1, 374-2 may be used to route a signal from, for example, a processor or the antenna controller 340 to direct the Wi-Fi antenna radio and front end 325-1 to emit certain RF signals at a specific frequency and control any hardware responsible for interaction with the processor or other controller executing the operating system of the information handling system 300. In an embodiment, the MAC sublayer 374-1, 374-2 may be where a Wi-Fi driver or other wireless driver and internet protocol (IP) layer exist. The physical layer 370-1, 370-2 may by any circuitry of device formed on the chipset of the Wi-Fi antenna radio and front end 325-1 such as an RF transceiver and other digital circuitry and embedded software that causes the RF transceiver part 372-1, 372-2 to carry data that transmitted and received and control of the RF parameters such as transmission and reception gain. RF transceiver parts 372-1 and 372-2 may have a plurality of parts to support operative coupling to the antennas (e.g., 348, 350, 352 and 354).

Figure 4A:
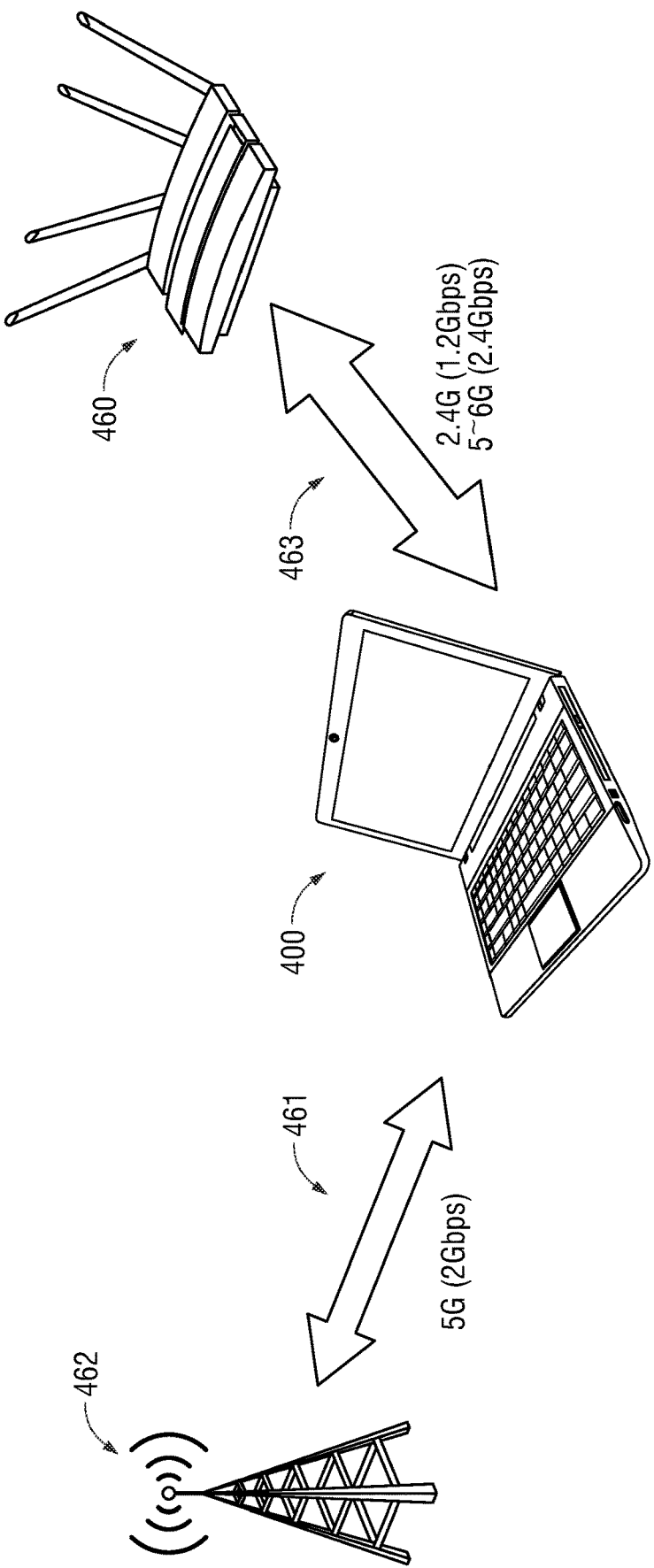
FIG. 4A is a block diagram illustrating an information handling system placed within a network according to another embodiment of the present disclosure.

FIG. 4A is a block diagram illustrating an information handling system 400 placed within a network according to another embodiment of the present disclosure. The diagram shown in FIG. 4A shows that the information handling system 400 may be operatively coupled, either concurrently or separately, to a wireless access point 460 and a base station 462 such as for a cellular service provider. In an example, the wireless access point 460 may be part of a number of wireless access points available on a WLAN. The base station 462 may be part of a WWAN cellular network.

The communication between the information handling system 400 and the base station 462 is indicative of the antennas associated with the WWAN front end (e.g., the cellular front end 325-2, FIG. 3) not being repurposed under embodiments herein. Again, based on sideband data traffic information, the wireless application telemetry data, and telemetry data from the WLAN front end and WWAN front end received at the antenna controller; the antennas associated with the WWAN front end have not been repurposed in the scenario shown in FIG. 4A. With reference to FIG. 3, the four antennas (e.g., 352, 354, 356, and 358, FIG. 3) of the WWAN front end are operatively coupled to the WWAN front end. This is because the antenna controller has not activated any RF switches used to repurpose any number of the four antennas (e.g., 352, 354, 356, and 358, FIG. 3) for use by the WLAN front end as described in embodiments herein. In this configuration, the information handling system 400 communicates with the base station 462 under a 5G protocol and may, in an example, be capable of transmitting/receiving data at a speed of 2 Gbps as indicated by arrow 461. Additionally, the information handling system 400 may be capable of communicating with a wireless access point 460, concurrently or not, under a concurrent dual high-band at 2.4 GHz and 5 GHz or 2.4 GHz and 6 GHz frequencies with data transmission and reception speeds of 1.2 Gbps and 2.4 Gbps, respectively as indicated by arrow 463.

As described herein, the operation of the information handling system 400 with the four antennas (e.g., 352, 354, 356, and 358, FIG. 3) operatively coupled to the WWAN front end was determined by the antenna controller based on the data traffic, the wireless application telemetry data, and telemetry data from the WLAN front end and WWAN front end. For example, the antenna controller, executing the antenna selection algorithm, may determine that the transmission and reception speeds between the information handling system 400 and base station 462 are acceptable based on the wireless application telemetry needs and the congestion data received from the base station 462. In an example where an email application is being executed, the antenna controller may determine that a high speed, high frequency communication with a wireless access point 460 is not necessary. The antenna controller may have also received input that the wireless access point 460 has a relatively higher congestion rate than the base station 462 thereby reducing the available bandwidth and data throughput at the wireless access point 460. The data traffic, the wireless application telemetry data, and telemetry data from the WLAN front end and WWAN front end may change, however, over time and the antenna controller receives this data on a regular basis in order to determine if and when to repurpose any of the four antennas (e.g., 352, 354, 356, and 358, FIG. 3) of the WWAN front end to the WLAN front end as described herein.

In an embodiment, WWAN communication (e.g., cellular) may not be used during execution of the methods described herein. For example, where a WLAN and WWAN enabled device is used by a user, the user may not insert a SIM card (or enable an eSIM profile) for a cellular service. In this embodiment, the cellular antennas 352, 354, 356, 358 are always available to be used by the Wi-Fi radio and front end 325-1. In this example embodiment, there is no need for telemetry to be received from the backend management server (e.g., Dell Optimizer®) or other applications on a host OS side. Here, the cellular antennas 352, 354, 356, 358 may always be available in order to support a 2×2, a 3×3 or a 4×4 HB WLAN wireless link with a WWAN. This may be similarly true where the Wi-Fi radio and front end 325-1 has a SIM profile. In this example, there is no IP context created, and a single antenna may be used for the monitoring the cell. If the execution of the OS leads to a decision to connect the cellular radio and front end 325-2 to a WWAN, the antenna controller 340 may know this from the OOB connection (e.g., sideband communication), and may, based on priority, move from a 4×4 WLAN to a 2×2 WLAN to allow a 4×4 WWAN connection to be setup. Alternatively, the Wi-Fi radio and front end 325-1 may remain in 4×4 WLAN and allow a 2×2 WWAN connection.

Figure 4B:
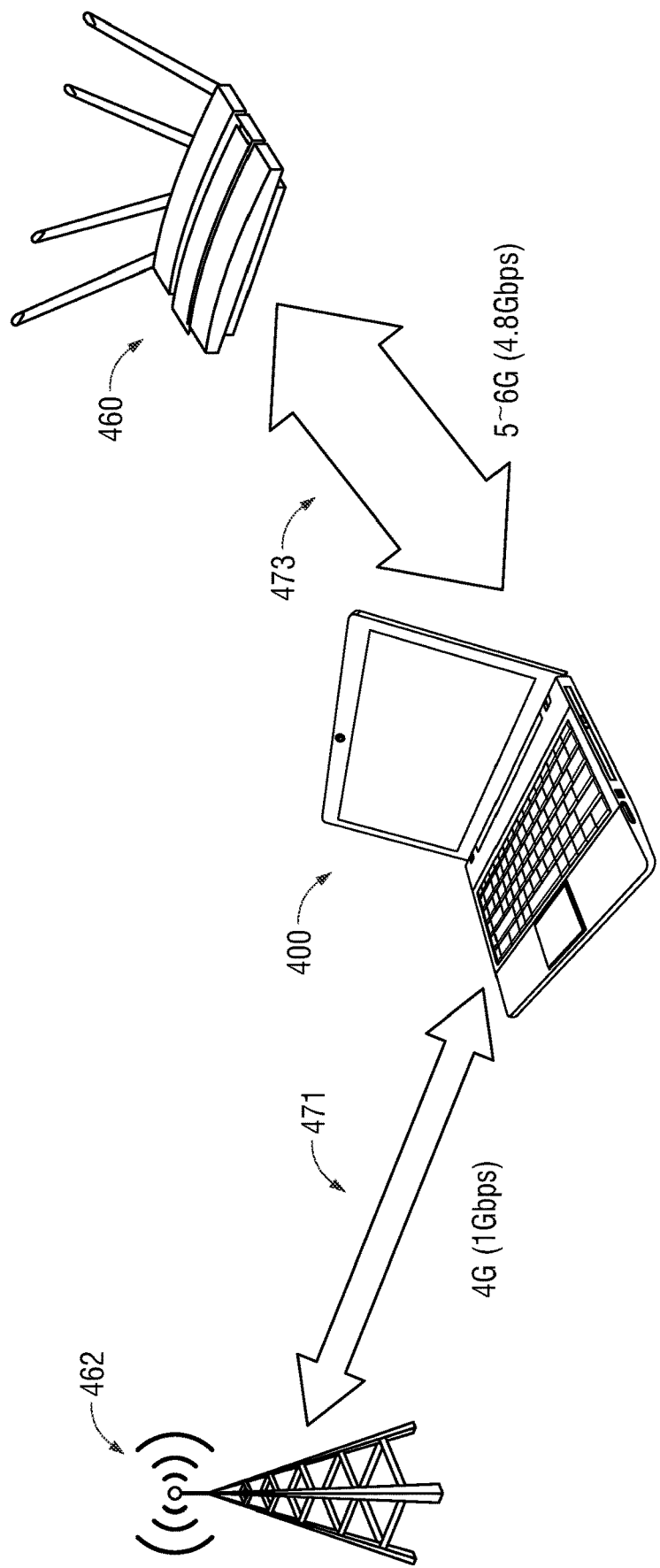
FIG. 4B is a block diagram illustrating an information handling system placed within a network according to another embodiment of the present disclosure.

FIG. 4B is a block diagram illustrating an information handling system 400 placed within a network according to another embodiment of the present disclosure. The diagram shown in FIG. 4B shows that the information handling system 400 may be operatively coupled, either concurrently or separately, to a wireless access point 460 and a base station 462 such as for a cellular service provider. In an example, the wireless access point 460 may be part of a number of wireless access points available on a WLAN. The base station 462 may be part of a WWAN cellular network. FIG. 4B shows that the antenna controller, based on the received sideband data traffic information, the wireless application telemetry data, and telemetry data from the WLAN front end and WWAN front end, has activated one or more RF switches to repurpose one or more WWAN antennas for use by the WLAN front end. Here, the antenna controller has used the data traffic, the wireless application telemetry data, and telemetry data from the WLAN front end and WWAN front end as input into the antenna selection algorithm and has received output indicating that the repurposing of one or more antennas (e.g., 352, 354, 356, and 358, FIG. 3) would benefit the connectivity of the information handling system 400 to a network via, for example, a wireless access point 460.

Due to the repurposing of certain antenna associated with the cellular front end to be used by a Wi-Fi front end as described in connection with FIG. 3, the information handling system 400 may communicate with the wireless access point 460 using a 4×4 MIMO group of transmitting and receiving antennas as illustrated by arrow 473. This may be done by repurposing two of the four antennas associated with the cellular front end for use with the Wi-Fi front end by the antenna controller. For example, the antenna controller, radios such as the Wi-Fi radio and front end and the cellular radio and front end may manage detecting and measuring received signal strength levels, bit error rates, signal to noise ratios, latencies, jitter, and other metrics relating to signal quality and strength of any of a plurality of communication networks made available to the information handling system 400. Additionally, the antenna controller may receive network congestion data descriptive of the data traffic at each available network. This data may be received via the execution of a sideband communication with one or more networks as described herein. These sets of data may be accumulated at the antenna controller. Additionally, certain wireless application telemetry data descriptive of resource requirements associated with an application executed on the information handling system 400 may be received at the antenna controller. As described in connection with FIG. 1, the antenna controller may execute an antenna selection algorithm to determine which, how many, and when any of the antennas associated with the cellular front end should be repurposed for use by the Wi-Fi front end depending on operating application needs, Wi-Fi availability, or signal quality, and data congestion on the WLAN or WWAN networks.

As described, the antenna controller may operatively couple the extra HB ports of the second radio of the WLAN front end (e.g., Wi-Fi front end) to two of the antennas associated with the cellular front end. In this embodiment, the WLAN front end may use these two additional antennas to form two 2×2 dual channel HB group of transceiving antennas or to form a 4×4 single channel HB group of transceiving antennas. This increases the speed of data transmitted and received by the WLAN front end from 3.66 Gbps to 4.8 Gbps as indicated by arrow 473. In comparison to FIG. 4A, the WWAN wireless link 461 may be reduced to 4G standards with transmission and reception speeds of 1 Gbps as indicated by arrow 471 as a tradeoff. This may be done when the antenna controller has determined, based on sideband data traffic information, the wireless application telemetry data and telemetry data from the WLAN front end and cellular front end, that the data transmission and reception speeds of the WLAN front end should be prioritized.

FIG. 4B also shows that the cellular front end of the information handling system 400 may communicate with a base station 462 at a WWAN cellular network. In this embodiment, the information handling system 400 communicates with the base station 462 using a 4G standard at 1 Gbps speeds as indicated by arrow 471. This is because two of the four antennas associated with the cellular front end have been repurposed for the Wi-Fi front end to implement a 2×2+2×2 dual channel HB group of transceiving antennas or to a 4×4 single channel HB group of transceiving antennas. The cellular data transmission or reception may be de-prioritized in such an embodiment relative to the Wi-Fi connectivity.

Figure 5A:
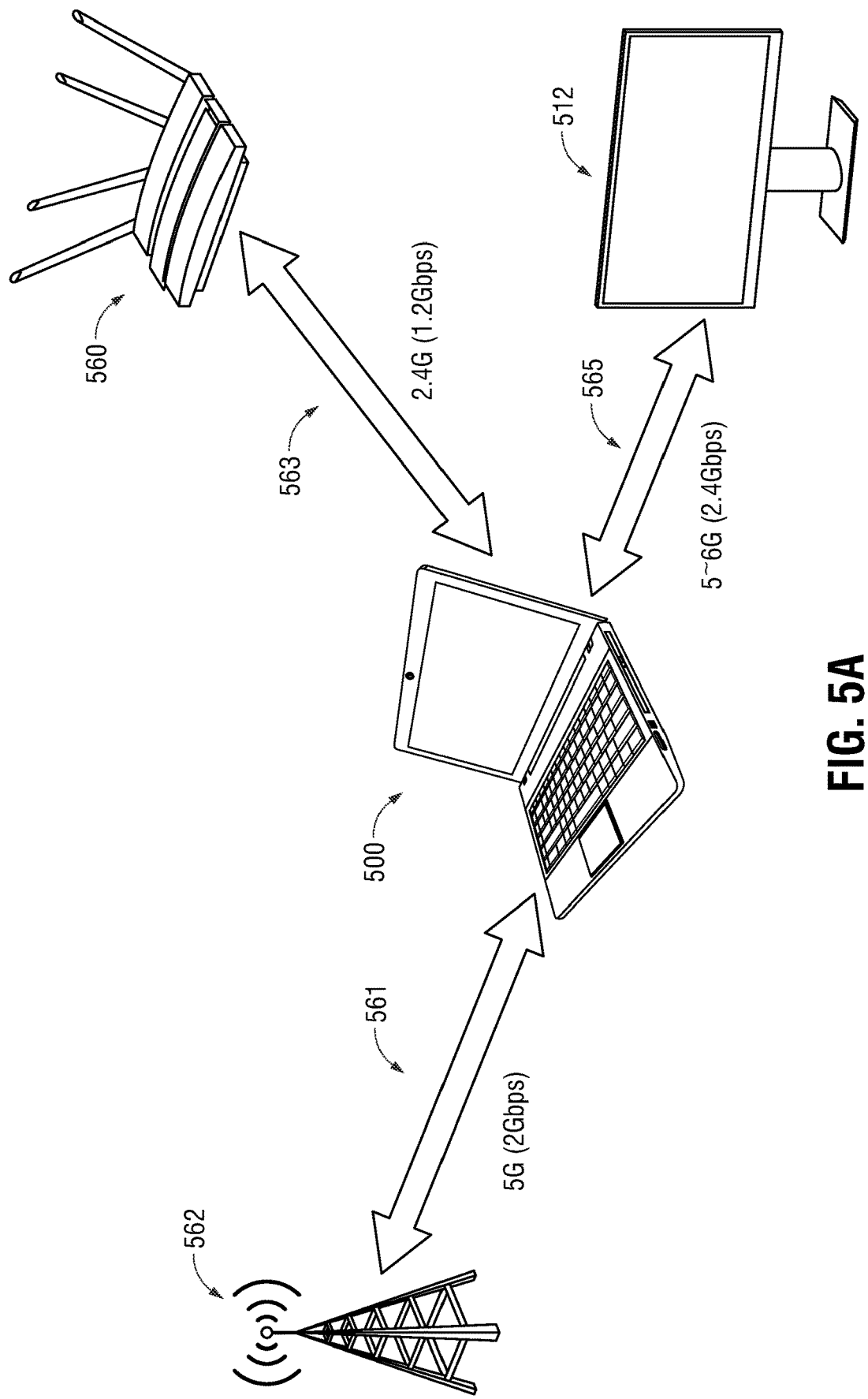
FIG. 5A is a block diagram illustrating an information handling system placed within a network according to an embodiment of the present disclosure.

FIG. 5A is a block diagram illustrating an information handling system 500 placed within a network according to an embodiment of the present disclosure. The diagram shown in FIG. 5A shows that the information handling system 500 may be operatively coupled, either concurrently or separately, to a wireless access point 560, a peripheral device such as a wireless display device 512 or a docking station, and a base station 562 such as for a cellular service provider. In an example, the wireless access point 560 may be part of a number of wireless access points available on a WLAN. The wireless display device 512 or docking station may be part of the WLAN as well. The base station 562 may be part of a WWAN cellular network.

The communication between the information handling system 500 and the wireless access point 560 and base station 562 is indicative of the antennas associated with the WWAN front end (e.g., the cellular front end 325-2, FIG. 3) not being repurposed according to embodiments herein. Again, based on the sideband data traffic information, the wireless application telemetry data, and telemetry data from the WLAN front end and WWAN front end received at the antenna controller; the antennas associated with the WWAN front end have not been repurposed in the scenario shown in FIG. 5A. With reference to FIG. 3, the four antennas (e.g., 352, 354, 356, and 358, FIG. 3) of the WWAN front end remain operatively coupled to the WWAN front end. This is because the antenna controller has not activated any RF switches used to repurpose any number of the four antennas (e.g., 352, 354, 356, and 358, FIG. 3) for use by the WLAN front end. Here, the execution of the antenna selection algorithm by the antenna controller has not indicated that any of the four antennas (e.g., 352, 354, 356, and 358, FIG. 3) should be repurposed. In this configuration, the information handling system 500 communicates with the base station 562 under a 5G protocol and may, in an example, be capable of transmitting/receiving data at a speed of 2 Gbps as indicated by arrow 561. Additionally, the information handling system 500 may be capable of communicating with a wireless access point 560, concurrently or not, under a dual band wireless link at 2.4 GHz at speeds of 2 Gbps as indicated by arrow 563. Further, the information handling system 500 may be capable of communicating with a wireless display device 512 or a docking station concurrently at 5 GHz or 6 GHz frequencies with data transmission and reception speeds of 2.4 Gbps as indicated by arrow 565.

As described herein, the operation of the information handling system 500 with the four antennas (e.g., 352, 354, 356, and 358, FIG. 3) operatively coupled to the WWAN front end was determined by the antenna controller based on the received sideband data traffic information, the wireless application telemetry data, and telemetry data from the WLAN front end and WWAN front end. For example, the antenna controller, executing the antenna selection algorithm, may determine that the transmission and reception speeds between the information handling system 500 and base station 562 are acceptable based on the wireless application telemetry needs and the congestion data received from the WWAN network associated with base station 562 or congestion information received from the network associated with access point (AP) 560. In an example where an email application is being executed, the antenna controller may determine that a high speed, high frequency communication with a wireless access point 560 is not necessary. The antenna controller may have also received input that the wireless access point 560 has a relatively higher congestion rate than the base station 562 thereby reducing the available bandwidth and data throughput at the wireless access point 560. The data traffic, the wireless application telemetry data, and telemetry data from the WLAN front end and WWAN front end may change, however, over time and the antenna controller receives this data on a regular basis in order to determine if and when to repurpose any of the four antennas (e.g., 352, 354, 356, and 358, FIG. 3) of the WWAN front end to the WLAN front end as described herein.

Figure 5B:
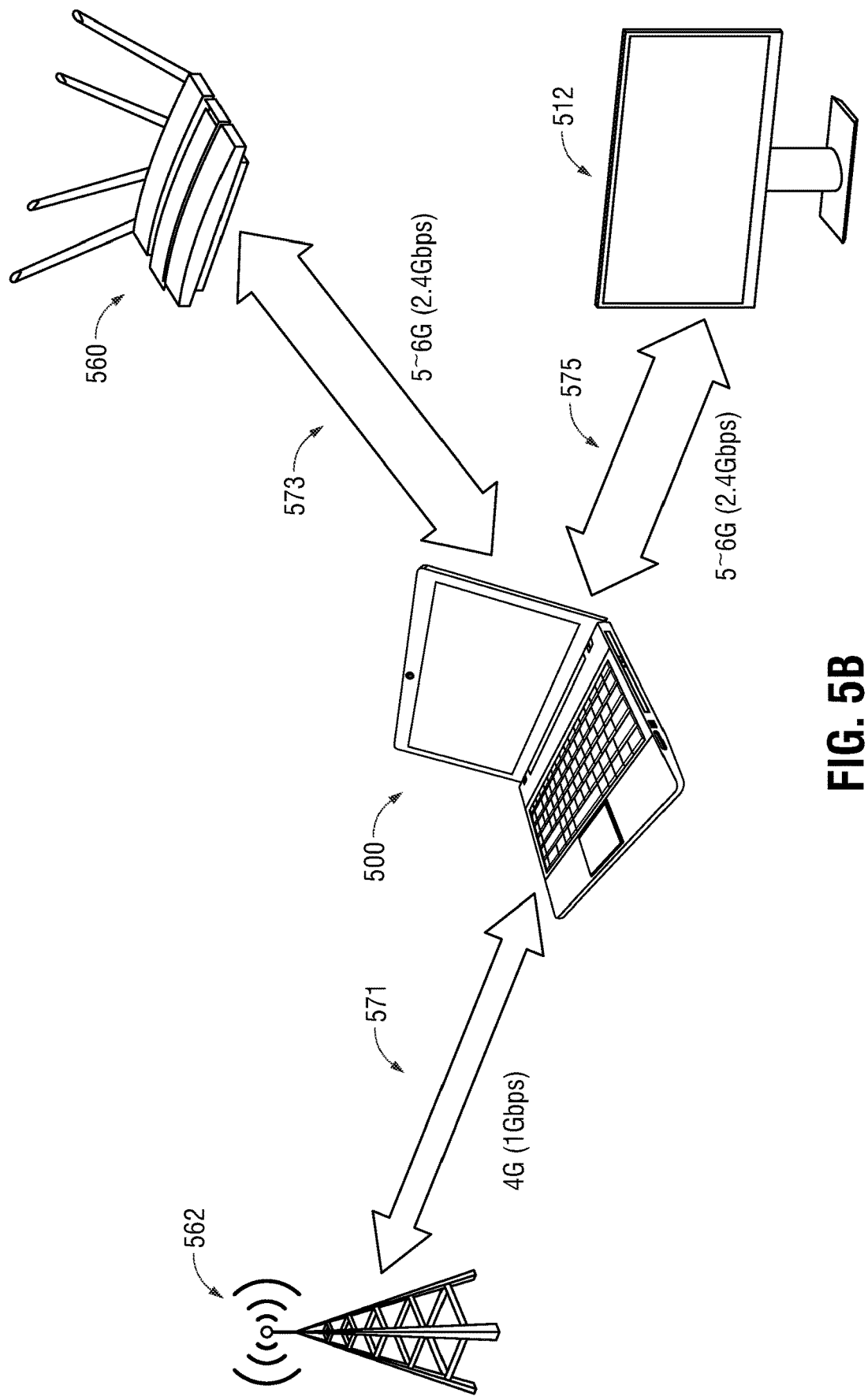
FIG. 5B is a block diagram illustrating an information handling system placed within a network according to another embodiment of the present disclosure.

FIG. 5B is a block diagram illustrating an information handling system placed within a network according to another embodiment of the present disclosure. The diagram shown in FIG. 5B shows that the information handling system 500 may be operatively coupled, either concurrently or separately, to a wireless access point 560, a peripheral device such as a wireless display device 512, and a base station 562 such as a cellular service provider. In an example, the wireless access point 560 may be part of a number of wireless access points available on a WLAN. In another embodiment, the information handling system 500 may connect wirelessly to a docking station or a wireless display device 512 may be part of the WLAN as well. The base station 562 may be part of a WWAN cellular network.

As described herein, the multiple antennas within the information handling system 500 may also be used to create two 2×2 dual channel HB group of transceiving antennas as shown in FIG. 5B at arrows 573 and 575 or to form a 4×4 single channel HB group of transceiving antennas as shown in FIG. 4B. Any remaining antennas associated with the cellular front end being operated at a 2×2 4G transmitting and receiving antenna. The antenna controller described herein may receive, as input, the data congestion information from the sideband communication, wireless application telemetry data from the processor or other central processing unit (CPU), and wireless telemetry data from the WLAN front end and cellular front end as described herein. As output, the antenna controller may determine to operatively switch two antennas associated with the cellular front end by accessing a number of RF switches associated with those antennas and operatively coupling those antennas to a HB port at, for example, a second radio of the WLAN front end. In this embodiment, the information handling system 500 may communicate with the base station 562 using the 4G standards and transmitting data a speed of 1 Gbps as a trade-off for higher WLAN data bandwidth as indicated by arrow 571. In this embodiment, the information handling system 500 may communicate with the wireless local network with data transmission and reception speeds of two 2×2 aggregated WLAN links of 2.4 Gbps at a 5 GHz frequency or a 6 GHz frequency shown at arrows 573 and 575. In the embodiment as shown in FIG. 5B, the information handling system 500 may engage in concurrent, multiple aggregated wireless connections with, for example, the wireless access point 560 and the wireless docking station or wireless display device 512. In this embodiment, the information handling system 500 may communicate with the wireless local network via the wireless access point 560 with data transmission and reception speeds of 2.4 Gbps at a 5 GHz frequency or a 6 GHz frequency as indicated by arrow 573. The information handling system 500 may also communicate, concurrently, with the wireless display device 512 or wireless docking station with data transmission and reception speeds of 2.4 Gbps at various different frequencies including a 5 GHz frequency or a 6 GHz or those associated with Bluetooth communication standards including those frequencies between 2.402 and 2.480 GHz or between 2.400 and 2.4835 GHz in an front end supporting both Bluetooth and Wi-Fi connectivity. In an embodiment, the information handling system 500 may communicate with the wireless local network via the wireless access point 560 with data transmission and reception speeds of 2.4 Gbps over a HB transmission to the display device 512 or a docking station. In this embodiment, a LB 2.4 GHz or HB 5/6 GHz may be used to transceived data to the wireless access point 560. If the communication link to the display device 512 or a docking station is not used, then the communication link 573 to the wireless access point 560 can be concurrent 2.4 GHz and 5/6 GHz transmissions.

Figure 6:
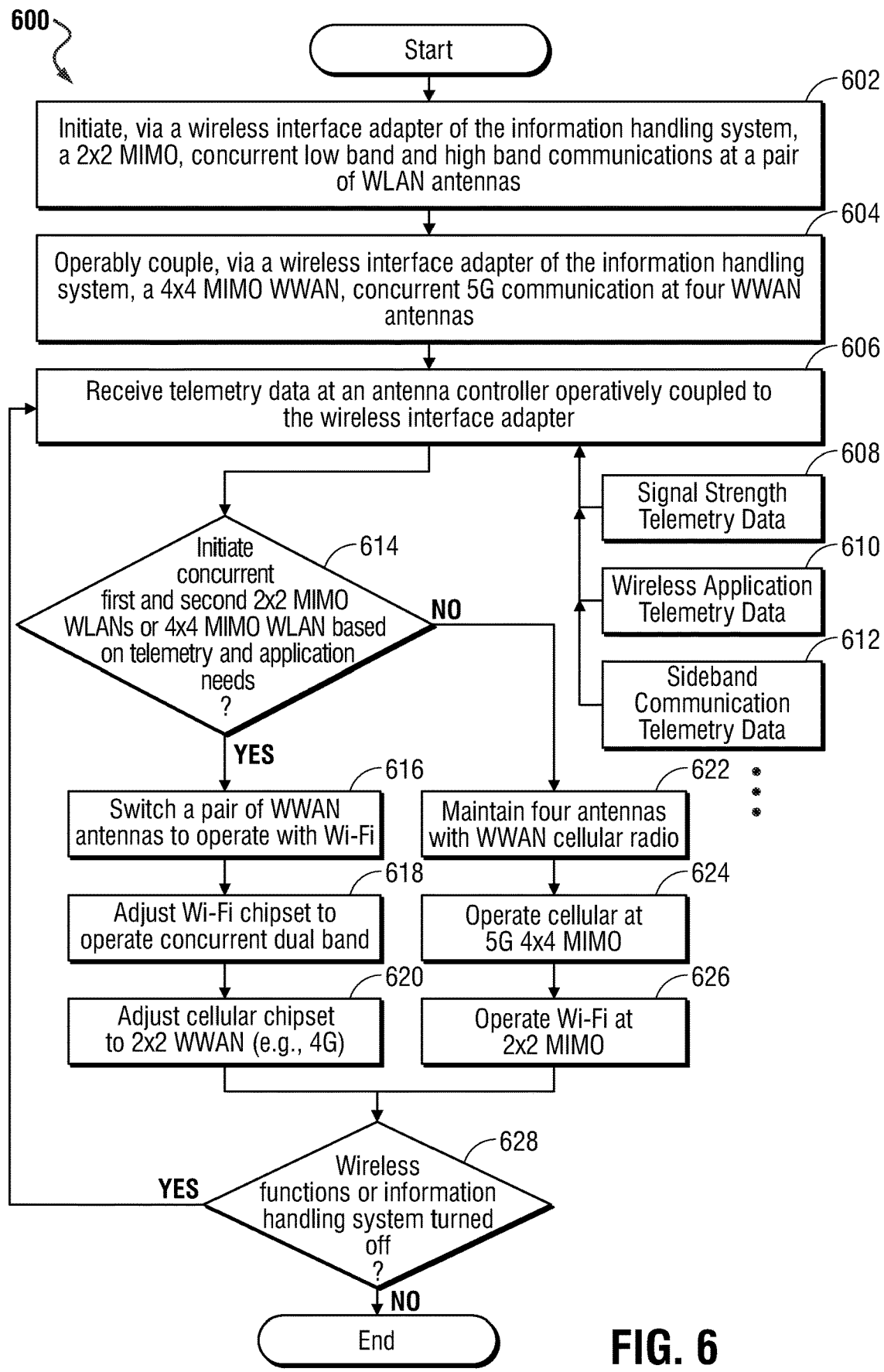
FIG. 6 is a flow diagram illustrating a method of executing an antenna selection algorithm executed by an information handling system according to an embodiment of the present disclosure.

FIG. 6 is a flow diagram illustrating a method 600 of executing an antenna selection algorithm executed by an information handling system according to an embodiment of the present disclosure. The method 600 may include, at block 602, initiating, via a wireless interface adapter of the information handling system, a 2×2 MIMO, concurrent low band and high band communications at a pair of WLAN antennas. In an embodiment, the information handling system may be similar to the information handling system described in connection with FIG. 1 with more than one antenna associated with a WLAN front end and more than one antenna associated with the cellular front end. These multiple antennas may be used to create a 2×2 MIMO LB+HB concurrent radio transmissions from the WLAN front end and a 4×4 MIMO HB radio transmissions from the cellular front end in a first antenna arrangement embodiment. However, as described herein, the antenna controller may be allowed to repurpose one or more antenna associated with the cellular front end for use by the Wi-Fi front end.

The method 600 may further include, at block 604, operably coupling, via a wireless interface adapter of the information handling system, a 4×4 MIMO WWAN, concurrent 5G communication at four antennas. Again, with reference, in an embodiment, to FIG. 1, a cellular front-end antenna may be operatively couplable to four different WLAN antennas and may be used to communicate with a network using a 4×4 MIMO WWAN communication. This type of communication may operate in a number of wireless communication frequency bands, some of which are proprietary. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network may be based on the radio access network (RAN) standards that implement, for example, gNodeB or eNodeB hardware connected to mobile phone networks (e.g., cellular networks) used to communicate with the information handling system. In an embodiment, the radio frequencies used by the four MIMO antennas may be dependent on the hardware with which the information handling system is communicating with in order to access the network.

The method includes receiving, at an antenna controller operatively coupled to the wireless interface adapter, telemetry data at block 606. The antenna controller may request this telemetry data from a plurality of sources such as the wireless interface adapter of the information handling system, a front end (e.g., cellular or Wi-Fi front end), a central processing unit, among other sources. In an embodiment, the antenna controller may initiate a sideband communication with any of the network available to the information handling system. For example, the wireless interface adapter may cause the WLAN front end (e.g., Wi-Fi front end) to search for a WLAN network (e.g., via a wireless access point 160) and initiate a sideband communication with that WLAN network. In another example, the wireless interface adapter may, alternatively or additionally cause the WWAN front end (e.g., cellular front end) to search for a WWAN network (e.g., via a base station) and initiate a sideband communication with that WWAN network. This sideband communication may request from a plurality of sources any telemetry data such as data traffic information 612 associated with the networks available to the information handling system to be operatively coupled to such a congestion data, traffic data, data bandwidth, and frequency bandwidth, among other data described herein. In an embodiment, the sideband communication may access sources at the various networks that are operated by a third party that maintains telemetry data that includes the congestion data, transmission speeds, data bandwidth, frequency bandwidth, and data throughput among other data. In an example embodiment, the antenna controller may execute and out-of-band (OOB) with a WLAN or WWAN network or a Wi-Fi or WWAN connection established with a backend management server for the information handling system such as one running Dell Optimizer® to manage one or more information handling systems. This sideband communication may access the backend server to obtain sideband data traffic communication telemetry data. The backend management server, such as the Dell Optimizer®, may have established access to one or more networks of cellular providers or administrated WLAN or private WWAN networks to obtain the data traffic information. In an embodiment, the telemetry data may not be received and instead the antenna controller may provide a decision to use a 4×4 Wi-Fi (and repurpose two antennas of the cellular radio and front end). In this embodiment, the cellular radio may be turned off or in idle mode and the telemetry data may be obtained via an OOB (e.g., sideband) interface with the radios.

The signal strength telemetry data represented at block 608 may be received by the antenna controller from any front end and may include data descriptive of a signal strength (e.g., received signal strength indicator; RSSI), a specific absorption rate (SAR) data, or any further data that describes the signal strength at any antenna to and from any available network as determined by a wireless adapter polling or otherwise measuring signal strength on various candidate wireless links.

The sideband communication data traffic telemetry data 612 represented at block 612 includes data associated with any available wireless networks such as available bandwidth, congestion statistics, throughput, available channels or bands, and operating radio frequencies, among other characteristics. The present specification, however, contemplates that other sideband communication telemetry data 612 may be received at the antenna controller that includes any data that describes the ability of any given antenna (e.g., associated with the cellular front end or Wi-Fi front end) to transmit and receive data at any given frequency to and from any wireless network. This may also include data obtained via the sideband communication, for example, that describes the hardware capabilities at the edge devices used by the information handling system to be operatively coupled to the network.

The wireless application telemetry data at block 610 may include any data descriptive of resource requirements associated with any wireless applications executing on the information handling system. For example, where the application being executed by the processor is an online gaming application, the wireless resources to be used to properly execute that application would be relatively higher than, for example, an email application. In some embodiments, this online gaming application may require high bandwidth and data throughput which further indicates which frequencies should be used to transmit and receive the data used during the execution of that online gaming application.

At this point, the telemetry data from the WLAN front end and cellular front end as well as the wireless application telemetry data from the processor received by the antenna controller is accumulated at a storage device associated with the antenna controller. The antenna controller, in an embodiment, may use this telemetry data as input into an antenna selection algorithm to receive, as output, a determination as how to operatively switch two antennas, for example, associated with the cellular front end.

The method 600 further includes, at block 614, determining whether to initiate concurrent first and second 2×2 MIMO WLANs or 4×4 MIMO WLAN based on telemetry for data traffic, signal levels, and application needs. As described herein, the execution of the antenna selection algorithm may determine if, when, and how to repurpose an antenna. The antenna or antennas, in an embodiment, may be associated with a cellular front end. In an embodiment, these antennas may be operatively coupled to switch to one or more high band ports at a WLAN front end (e.g., Wi-Fi front end) based on the telemetry data (e.g., wireless application telemetry data and radio telemetry data).

Where the telemetry and application needs indicate that either a first and second 2×2 MIMO WLAN radio communication or a 4×4 MIMO WLAN radio communication is to be initiated, the method 600 continues on to block 616. At block 616 a pair of WWAN antennas are switched from being operatively coupled to a cellular front end to the Wi-Fi front end using one or more switches. In an embodiment, when the antenna controller determines that pair of WWAN antennas associated with the cellular front end should be used by the Wi-Fi front end, the antenna controller may access one or more RF switches to switch the input at these antennas from the cellular front end to the Wi-Fi front end. In an embodiment, the antenna controller may further instruct the Wi-Fi front end that the Wi-Fi front end is to operate in the first and second 2×2 MIMO WLAN radio communication configurations or in a 4×4 MIMO WLAN radio communication configuration.

This example embodiment is depicted in FIG. 3. As described in connection with FIG. 3, the antenna controller selectively couples a third antenna to the Wi-Fi front end by accessing a first switch thereby switching the output from the cellular front end of the third antenna to output from the Wi-Fi front end. Additionally, the antenna controller selectively couples a fourth antenna to the Wi-Fi front end by accessing a second switch and switching the output from the cellular front end of the fourth antenna to output from the Wi-Fi front end. In an embodiment, the first switch and second switch may be combined into a single switch that automatically switches both the third antenna and fourth antenna from being operatively coupled to the cellular front end and, instead, to the Wi-Fi front end. This repurposing or reassignment of the antennas may continue until, via the telemetry data indicates to the antenna controller that the repurposing may end or the wireless system is to be tuned off at 628 below.

After switching the pair of WWAN antennas to operate with the Wi-Fi front end at block 616, the method 600 also includes adjusting the Wi-Fi chipset to operate in a concurrent dual high band configuration at block 618. The concurrent dual high band configuration allows a 2×2+2×2 dual channel HB group of transceiving antennas or a 4×4 single channel HB group of transceiving antennas to increase the speed of data transmission between the information handling system and a WLAN network as shown or described in connection with FIG. 4B or 5B. In an embodiment, this increases the speed of data transmitted and received by the Wi-Fi front end from 3.66 Gbps to 4.8 Gbps. In an embodiment where the 2×2+2×2 dual channel HB group of transceiving antennas is formed, the information handling system may be allowed to communication with a network device and, for example, a wireless display device or other peripheral device as described herein. Again, in an embodiment, the antenna controller may further instruct the cellular front end that the cellular front end is to operate in a 2×2 MIMO WWAN radio communication configuration.

After switching the pair of WWAN antennas to operate with the Wi-Fi front end at block 616, the method 600 also includes adjusting the cellular chipset to operate under a 2×2 WWAN (e.g., 4G) at block 620. In this embodiment, the cellular chipset may operate a remaining pair of WLAN antennas at 1 Gbps as opposed to a 2 Gbps speed because two of the four antennas have been switched over to the Wi-Fi front end. Here, the information handling system, via execution of the antenna controller and the algorithm described herein, has determined that faster communication over a WWAN communication network would benefit the user the most based on the telemetry data received. The method 600 may proceed to block 628. If and when this telemetry data changes through monitoring at block 606, the antennas may be repurposed again to fit the operational needs of the information handling system.

Referencing to block 614, where the telemetry and application needs indicate that that neither a first and second 2×2 MIMO WLAN radio communication or a 4×4 MIMO WLAN radio communication should be initiated, the method 600 continues on to block 622. At block 622, the operative coupling of the four antennas associated with the WWAN cellular are maintained and the four WWAN antennas continue to operate at a cellular 4×4 MIMO operation at block 624. Additionally, the two antennas associated with the Wi-Fi front end may continue to operate at a 2×2 MIMO operation per block 626. In this embodiment, the information handling system, via execution of the antenna controller and the algorithm described herein, has determined that operation of cellular front end in a 4×4 MIMO configuration would allow for better wireless performance of the information handling system. The antenna controller then instructs the cellular front and WLAN front end that those four antennas associated with the cellular front end are to remain operatively coupled to the cellular front end. At block 624, the method may include operating a cellular front end using a 5G protocol with a 4×4 MIMO configuration with the four antennas remaining operatively coupled to the cellular front end (e.g., antennas 352, 354, 356, 358 of FIG. 3). Alternatively, the method 600 at block 624 may include operating the cellular front end using a 4G protocol with a 4×4 MIMO configuration with the four antennas remaining operatively coupled to the cellular front end (e.g., antennas 352, 354, 356, 358 of FIG. 3) in an embodiment. This may include the antenna controller not activating the switches such that the cellular front end is associated with four cellular antennas as described in connection with FIG. 3. Additionally, at block 626, the WLAN front end (e.g., Wi-Fi front end 325-1, FIG. 3) may operate with the two antennas (e.g., 348 and 350, FIG. 3) operating alongside the four cellular front-end antennas as the 2×2 MIMO operation as described herein. Again, the antenna controller may instruct the WLAN front end that that is how the WLAN front end is to operate. The method may then proceed to block 628.

At block 628, the method 600 includes determining whether the wireless functions or the information handling system itself has been turned off. Where the wireless functions are continuing to be operated, the method may continue at block 606 with continuing to receive any telemetry data as described and monitoring usage of the plural antennas. Where either the wireless functions or the information handling system itself have been turned off, the method may end.

The blocks of the flow diagrams of FIG. 6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor executing code instructions on a memory of the information handling system;
   a power management unit (PMU) providing power to the processor, memory, and a wireless interface adapter;
   the wireless interface adapter to communicate, via a plurality of transceiving antennas operated by one or more radios, a plurality of operating wireless links, wherein the plurality of transceiving antennas operate in a multiple-in-multiple-out (MIMO) array configuration; and an antenna controller to receive data descriptive of network data traffic information, wireless connection states, and signal telemetry data via a sideband wireless communication link from a cellular front end and initiate a dual high band wireless local-area network (WLAN) communication by switching a first transceiving antenna of the plurality of transceiving antennas associated with the cellular front end to be operatively coupled to one or more high band ports at a WLAN front end; and the antenna controller to issue instructions to the cellular front end to adjust a subset of transceiving antennas and to issue instructions to the WLAN front end to operate with the first transceiving antenna.

2. The information handling system of claim 1 further comprising:
a switch operatively coupling the one or more high band ports to the antenna associated with the cellular front end.

3. The information handling system of claim 1 further comprising:
the antenna controller to switch a second transceiving antenna of the plurality of transceiving antennas associated with the cellular front end to operatively couple to a high band port to create a 4×4 MIMO high band WLAN communication for the WLAN front end and with a 2×2 cellular communication on the cellular front end.

4. The information handling system of claim 1 further comprising:
the processor and antenna controller operatively coupled together for the processor to send to the antenna controller wireless application telemetry data descriptive of resource requirements associated with an executed wireless application.

5. The information handling system of claim 1 further comprising:
the antenna controller operatively coupled, via the sideband wireless communication link, to the information handling system to receive, from a cellular network, cellular telemetry data descriptive of the data traffic information of the cellular network.

6. The information handling system of claim 1 further comprising:
the antenna controller operatively coupled, via the sideband wireless communication link to the information handling system to receive, from the WLAN front end, WLAN telemetry data descriptive of the data traffic information for a WLAN network.

7. The information handling system of claim 1 further comprising:
the WLAN front end including a chipset including:
a first radio to provide a high band signal to each of two diplexers; and
a second radio to provide a low band signal to each of the two diplexers;
the second radio to provide a high band signal to the first transceiving antenna of the plurality of transceiving antennas switched from the cellular front end to the WLAN front end.

8. A method of antenna control at an information handling system comprising:

initiating, via a wireless interface adapter of the information handling system, a 2×2 data link with multiple-in-multiple-out (MIMO), concurrent low band and high band communications at a pair of wireless local-area network (WLAN) antennas;

receiving at an antenna controller operatively coupled to the wireless interface adapter via a sideband communication, data traffic information for a wireless wide-area network (WWAN) and for a WLAN;

receiving from a central processing unit of the information handling system wireless application telemetry data descriptive of resource requirements associated with an executed wireless application;

based on the data traffic information and the wireless application telemetry data, initiating a MIMO high band WLAN communication by repurposing a first antenna associated with a cellular front end to be operatively coupled to one or more high band ports at a WLAN front end; and instructing, via the antenna controller, the WLAN front end to operate with the first antenna.

9. The method implemented at an information handling system of claim 8 further comprising:
sending a signal to a switch to operatively switch coupling the first antenna coupling the first antenna from the cellular front end to the WLAN front end.

10. The method implemented at an information handling system of claim 8 further comprising:
repurposing a second antenna associated with the cellular front end to be operatively coupled to a high band port to create a 4×4 MIMO high band WLAN communication at a WLAN front end and a 2×2 cellular communication at the cellular front end.

11. The method implemented at an information handling system of claim 8 further comprising:
the antenna controller operatively coupled, via the sideband wireless communication link, to the information handling system to receive from a cellular network, cellular telemetry data descriptive of the data traffic information of the cellular network.

12. The method implemented at an information handling system of claim 8 further comprising:
the antenna controller operatively coupled, via the sideband wireless communication link, to receive, from a WLAN front end, WLAN telemetry data descriptive of the data traffic information for a WLAN network.

13. The method implemented at an information handling system of claim 8 further comprising:
the WLAN front end including a chipset including:
a first radio to provide a high band signal to each of two diplexers; and
a second radio to provide a low band signal to each of the two diplexers;
the second radio to provide a high band signal to the first transceiving antenna of the plurality of transceiving antennas switched from the cellular front end to the WLAN front end.

14. The method implemented at an information handling system of claim 8 further comprising:
the MIMO high band WLAN communication operated as a 2×2 dual channel high band MIMO WLAN operation when the first antenna is repurposed and when a second antenna associated with the cellular front end is repurposed from being coupled to the cellular front end to the WLAN front end.

15. The method implemented at an information handling system of claim 8 further comprising:

the MIMO high band WLAN communication operated as a 4×4 single channel high band MIMO WLAN operation when the first antenna is repurposed and when a second antenna associated with the cellular front end is repurposed from being coupled to the cellular front end to the WLAN front end.

16. A wireless interface adapter for an information handling system for repurposing an antenna comprising:

a processor to receive wireless application telemetry data descriptive of resource requirements associated with an executed wireless application executed on the information handling system;

the processor to initiate a sideband communication via the wireless interface adapter establishing a wireless link to a remote information handling system management system to receive data descriptive of data traffic information, wireless connection states, and telemetry data for a wireless local-area network (WLAN) and a cellular network; and the processor to initiate a dual high band WLAN communication with an antenna controller at the wireless interface adapter by repurposing first and second antennas associated with the cellular front end to be operatively coupled to one or more high band ports at the WLAN front end and the antenna controller operating two antennas associated with the WLAN front end and the first and second antennas switched from the cellular front end in a multiple-in-multiple-out (MIMO) array configuration for the WLAN front end.

17. The wireless interface adapter of claim 16 further comprising further comprising:

a switch operatively coupling the one or more high band ports to the antenna associated with the cellular front end.

18. The wireless interface adapter of claim 16 further comprising further comprising:

the processor to repurpose two antennas associated with the cellular front end each operatively coupled to a high band port to create a 4×4 MIMO high band WLAN communication for the WLAN front end and with a 2×2 cellular communication on the cellular front end.

19. The wireless interface adapter of claim 16 further comprising:

the antenna controller operatively coupled, via the sideband wireless communication link, to the processor of information handling system to receive, from a cellular network, cellular telemetry data descriptive of the data traffic information of the cellular network.

20. The wireless interface adapter of claim 16 further comprising:

the antenna controller operatively coupled, via the sideband wireless communication link to the processor of information handling system to receive, from a WLAN front end, WLAN telemetry data descriptive of the data traffic information for a WLAN network.

* * * * *